(12) United States Patent
Beck et al.

(10) Patent No.: US 11,764,828 B2
(45) Date of Patent: Sep. 19, 2023

(54) CROSSTALK REDUCTION IN MULTI-CHANNEL ACOUSTO-OPTIC MODULATORS

(71) Applicant: IONQ, INC., College Park, MD (US)

(72) Inventors: Kristin Marie Beck, College Park, MD (US); Vandiver Chaplin, College Park, MD (US)

(73) Assignee: IONQ, INC., College Park, MD (US)

( * ) Notice: Subject to any disclaimer, the term of this patent is extended or adjusted under 35 U.S.C. 154(b) by 273 days.

(21) Appl. No.: 17/349,457

(22) Filed: Jun. 16, 2021

(65) Prior Publication Data

US 2021/0399763 A1    Dec. 23, 2021

Related U.S. Application Data

(60) Provisional application No. 63/040,270, filed on Jun. 17, 2020.

(51) Int. Cl.
*H04B 10/2575* (2013.01)
*H04B 3/32* (2006.01)

(52) U.S. Cl.
CPC ........... *H04B 3/32* (2013.01); *H04B 10/2575* (2013.01)

(58) Field of Classification Search
CPC .......... H04B 10/2575; H04B 10/25752; H04B 10/70; H04B 2210/006; H04B 3/32
USPC .................................................. 398/115, 116
See application file for complete search history.

(56) References Cited

U.S. PATENT DOCUMENTS

| | | | |
|---|---|---|---|
| 2020/0082291 A1* | 3/2020 | Debnath | G02F 1/113 |
| 2021/0157180 A1* | 5/2021 | Wasilousky | H05K 3/4038 |
| 2021/0263390 A1* | 8/2021 | Beck | G06N 10/00 |

* cited by examiner

*Primary Examiner* — Hibret A Woldekidan
(74) *Attorney, Agent, or Firm* — ARENTFOX SCHIFF LLP

(57) ABSTRACT

Aspects of the present disclosure describe controlling coherent crosstalk errors in multi-channel acousto-optic modulators (AOMs). A method, an AOM system, and a quantum information processing (QIP) system are described in which a separate radio-frequency (RF) signal is generated and applied to each of multiple channels of a multi-channel AOM using an arbitrary waveform generator (AWG) to turn on each of those channels, where each channel that is turned on interacts with one or more of the remaining channels that are not turned on to cause a combined crosstalk effect on those remaining channels. Each channel has a single respective AWG. Moreover, a correcting RF signal is generated and applied to the one or more of the remaining channels using a respective AWG to produce an acoustic wave that corrects for the combined crosstalk effect such that the one or more of the remaining channels are not unintentionally turned on.

23 Claims, 13 Drawing Sheets

CROSSTALK REDUCTION IN MULTI-CHANNEL ACOUSTO-OPTIC MODULATORS

CROSS REFERENCE TO RELATED APPLICATIONS

The present application claims priority to and the benefit of U.S. Provisional Patent Application No. 63/040,270, entitled "CROSSTALK REDUCTION IN MULTI-CHANNEL ACOUSTO-OPTIC MODULATORS," and filed on Jun. 17, 2020, the contents of which are incorporated herein by reference in its entirety.

BACKGROUND

Aspects of the present disclosure relate generally to cancelling crosstalk noise caused by one or more channels in nearby channels of a multi-channel acousto-optic modulator (AOM) used in a trapped ion quantum computer, and more particularly, the present disclosure describes techniques that take into account one or more criteria to control coherent crosstalk noise that results in one or more of the channels of the multi-channel AOM by using signals to correct for the crosstalk noise and thereby generate better quantum gates and perform more accurate quantum operations.

Trapped atoms are one of the leading implementations for quantum information processing (QIP) or quantum computing. Atomic-based qubits, such as atomic ions, neutral atoms, and atoms in their Rydberg state, can be used as quantum memories, as quantum gates in quantum computers and simulators, and can act as nodes for quantum communication networks. Qubits based on trapped atomic ions enjoy a rare combination of attributes. For example, qubits based on trapped atomic ions have very good coherence properties, can be prepared and measured with nearly 100% efficiency, and are readily entangled with each other by modulating their Coulomb interaction with suitable external control fields such as optical or microwave fields. These attributes make atomic-based qubits attractive for extended quantum operations such as quantum computations or quantum simulations.

The accuracy with which atomic-based qubits are manipulated is important to avoid errors during quantum operations. In a trapped ion quantum computer, AOMs are used to control optical beams that are deflected from the AOMs, which in turn are used to control the atomic-based qubits. In a multi-channel AOM, where each channel may correspond to an individual optical beam and its respective atomic-based qubit, the application of radio-frequency (RF) energy or an RF signal in one channel may inadvertently impact one or more other channels. For example, turning on one channel may result in an adjacent or nearby channel being unintentionally turned on. In some instances, a portion of the RF energy and/or acoustic energy associated with one channel in a multi-channel AOM may "leak" into one or more neighboring channels. The "leak" contributes to crosstalk noise or errors, and may negatively impact the operation and/or control of the AOM, which as mentioned above, may also impact the fidelity of the quantum operations being implemented with the atomic-based qubits. It is therefore important to minimize the impact of crosstalk noise or errors on neighboring channels in a multi-channel AOM to avoid the unintended effects of such crosstalk noise or errors on non-targeted channels and their respective atomic-based qubits.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of this disclosure, a method includes radio-frequency generating and applying a separate radio-frequency (RF) signal to each of multiple channels in the multi-channel AOM using a respective arbitrary waveform generator (AWG) to turn on the multiple channels, each of the multiple channels that is turned on may interact with at least one of the remaining channels in the multi-channel AOM that is not turned on causing a combined crosstalk effect on the at least one of the remaining channels. Each channel in the multi-channel AOM may have a single respective AWG, that is, each channel has a single dedicated AWG for that channel. The method further includes generating and applying a correcting RF signal to the at least one of the remaining channels using its respective AWG to produce an acoustic wave that at least partially corrects for the combined crosstalk effect caused by the multiple channels. This at least partial correction is such that turning on the multiple channels does not cause at least one of the remaining channels to be unintentionally turned on (e.g., the channel remains off—as intended—even in the presence of the combined crosstalk effect).

In some aspects of the present disclosure, an AOM system includes a crystal with multiple RF antennas patterned on one side to form multiple channels of the multi-channel AOM system and an RF absorber on the other side, where the crystal is configured to deflect one or more optical beams and shift a frequency of the one or more optical beams in a time-dependent manner. The AOM system also includes multiple AWGs, each of which is associated with a respective channel of the multiple channels, and where the AWGs are configured to generate and apply a separate RF signal to each of multiple channels in the multi-channel AOM to turn on the multiple channels, where each of the multiple channels that is turned on may interact with one or more of the remaining channels in the multi-channel AOM that is not turned on causing a combined crosstalk effect on at least one of the remaining channels. Each channel in the multi-channel AOM may have a single respective AWG, that is, each channel has a single dedicated AWG for that channel. The AWGs are further configured to generate and apply a correcting RF signal to each of the at least one remaining channels to produce an acoustic wave that at least partially corrects for the combined crosstalk effect caused by the multiple channels, the at least partial correction being such that turning on the multiple channels does not cause the remaining channels to be unintentionally turned on (e.g., the channel remains off—as intended—even in the presence of the combined crosstalk effect).

In another aspect of this disclosure, a quantum information processing (QIP) system includes a multi-channel AOM, multiple AWGs, each of which is associated with a respective channel of the multi-channel AOM, a trap having multiple trapped atomic-based elements, and an optical source configured to emit one or more optical beams to respective channels on the multi-channel AOM to change a state of a respective one of the of trapped ions to implement a quantum operation. Atomic-based elements may refer to charged ions, neutral atoms, and/or Rydberg atoms, for example. The trap used may be different based on the type of atomic-based element used. In the case of trapped ions or trapped charged ions, the trap used may be one of different types of ion traps. The AWGs are configured to generate and apply a separate RF signal to each of multiple channels in the multi-channel AOM to turn on the multiple channels, where each of the multiple channels that is turned on interacts with at least one of the remaining channels in the multi-channel AOM that is not turned on causing a combined crosstalk effect on the at least one of the remaining channels. Each channel in the multi-channel AOM may have a single respective AWG, that is, each channel has a single dedicated AWG for that channel. The AWGs are further configured to generate and apply a correcting RF signal to each of the at least one of the remaining channels to produce an acoustic wave that at least partially corrects for the combined crosstalk effect caused by the multiple channels, the at least partial correction being such that turning on the multiple channels does not cause the at least one of the remaining channels to be unintentionally turned on (e.g., the channel remains off—as intended—even in the presence of the combined crosstalk effect).

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
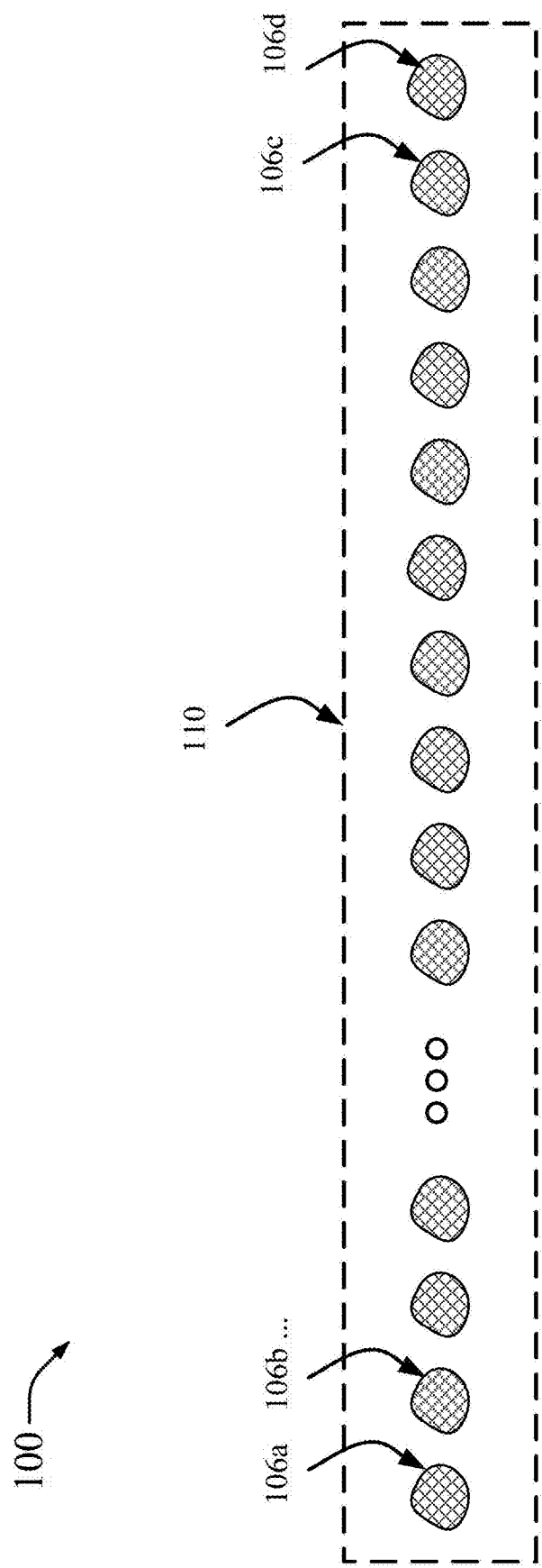
FIG. 1 illustrates a view of atomic ions a linear crystal or chain in accordance with aspects of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

As described above, trapped atoms may be used to implement quantum information processing systems or quantum computers. Atomic-based qubits can be used as different type of devices, including but not limited to quantum memories, quantum gates in quantum computers and simulators, and nodes for quantum communication networks. As used in this disclosure, the terms "atomic ions," "atoms," "charged ions," and "ions" may be used interchangeably to describe the particles that are to be confined, or are actually confined, in a trap to form a crystal or similar arrangement or configuration. Neutral atoms and/or Rydberg atoms may be used in a similar manner as ions and, therefore, quantum information processing systems or quantum computers that use neutral atoms and/or Rydberg atoms may use the techniques described herein.

Individual addressing of each ion that is trapped in an ion trap may be needed to control the phase, frequency, and/or amplitude, and also the polarization, as required by a particular quantum gate or quantum operation to be implemented using the ion trap. One or more optical beams may be used to individually address the trapped ions in the ion trap, and in some instances, a global optical beam may be applied to all of the trapped ions. These counter-propagating optical beams, referred to as Raman optical beams or simply as Raman beams, may be produced or controlled by using a multi-channel AOM, which is a crystal having various piezo-electric transducers patterned with radio-frequency antennas, traces, or electrodes on one side and a radio-frequency absorber on the other side that deflect optical beams and shift its frequencies. The interaction with each optical beam may be separately controlled by an RF waveform generator (e.g., an AWG) and a piezo-electric transducer in a respective channel of the multi-channel AOM.

A problem arises in a multi-channel AOM when the application of RF energy or an RF signal in one channel may inadvertently impact or affect another channel. For example, turning on one channel may result in an adjacent or nearby channel being unintentionally turned on, e.g., unintentionally deflecting the optical beam present in that channel. In some instances, a portion of the RF energy and/or acoustic energy associated with one channel in the multi-channel AOM may "leak" into one or more neighboring channels.

The "leak" may contribute to crosstalk noise and/or errors and may negatively impact the operation and/or control of the atomic-based qubits controlled by the multi-channel AOM (e.g., causing unintentional changes to the states of the trapped ions). To reduce or eliminate crosstalk noise or errors that result in certain individual channels, additional compensation tones (e.g., correction/correcting RF signals) may be applied to the appropriate channels of the AOM. The compensation tones may cancel/reduce the crosstalk effects that have "leaked" from neighboring channels. It is to be understood that in some cases the compensation tones may themselves generate crosstalk and the process may need to be iterated until the overall effect of crosstalk is reduced in the various channels of a multi-channel AOM.

Solutions to the issues described above are explained in more detail in connection with FIGS. 1-13.

FIG. 1 shows a diagram 100 that illustrates multiple atomic ions 106 (e.g., atomic ions 106*a*, 106*b*, . . . , 106*c*, and 106*d*) trapped in a linear crystal or chain 110 using a linear RF Paul trap (the linear crystal shown in the diagram 100 can be inside a vacuum chamber not shown) also referred to as an ion trap. In the example shown in FIG. 1, a vacuum chamber in a quantum system includes electrodes for trapping multiple (e.g., N=20) atomic Ytterbium ions (e.g., $^{171}Yb^+$ ions) which are confined in the chain 110 and are laser-cooled to be nearly at rest. The number of atomic ions trapped can be configurable and more or fewer atomic ions may be trapped. The atoms are illuminated with laser (optical) radiation tuned to a resonance in $^{171}Yb^+$ and the fluorescence of the atomic ions is imaged onto a camera. In this example, atomic ions are separated by about 5 microns (μm) from each other. The separation of the atomic ions is determined by a balance between the external confinement force and Coulomb repulsion and does not need to be uniform. Moreover, in addition to atomic Ytterbium ions, neutral atoms, Rydberg atoms, other atomic ions or species of atomic ions may also be used. Instead of linear RF Paul traps, optical or other form of confinement may be used. Thus, a confinement device may be based on different techniques and may hold ions, neutral atoms, or Rydberg atoms, for example, with an ion trap being one example of such a confinement device.

Figure 2:
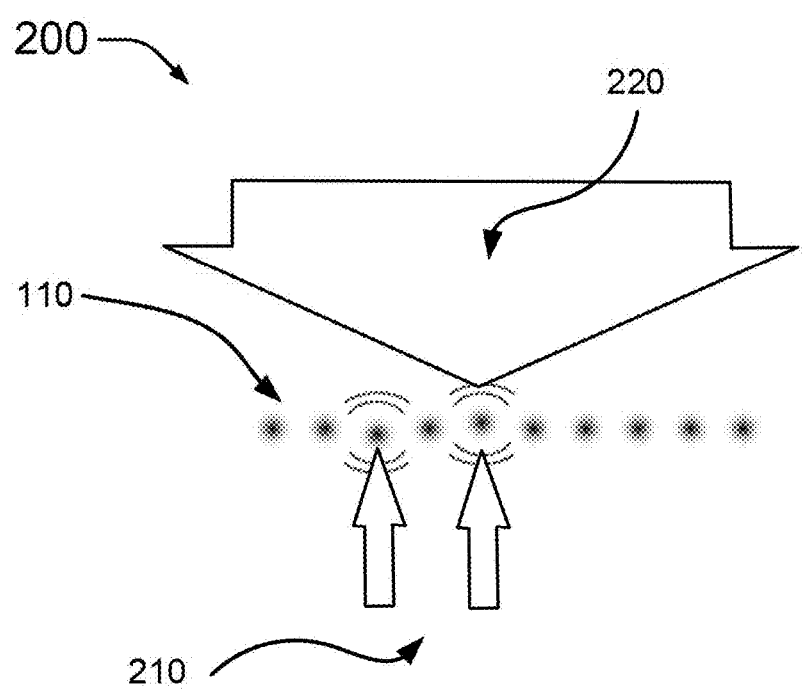
FIG. 2 is a diagram illustrating an example of Raman beam geometry in accordance with aspects of the disclosure.

FIG. 2, which shows a diagram 200 illustrating an example of Raman optical beam geometry for use in trapped ion systems in which individual optical beams 210 and a global optical beam 220 are directed to the chain 110 having the atomic ion qubits to control the atomic ion qubits to perform quantum operations. The optical beams in the same direction may be referred to as co-propagating optical beams and the optical beams in different or opposite directions may be referred to as non-co-propagating or counter-propagating optical beams, respectively. The individual optical beams 210 (co-propagating) are focused optical beams that individually address the ions, while the global optical beam 220 (which, as shown, counter-propagates with respect to the individual beams 210) may be an unfocused or focused optical beam that impinges on all of the ions. In some instances, instead of the global optical beam 220 additional individual optical beam 210 may also be used. As used herein, the terms laser beams, optical beams, beams, optical fields, and fields may be used interchangeably. Each of the individual optical beams 210 can be controlled by, for example, a different channel in a multi-channel AOM. The global optical beam 220 can also be controlled by a respective channel in an AOM.

Figure 3:
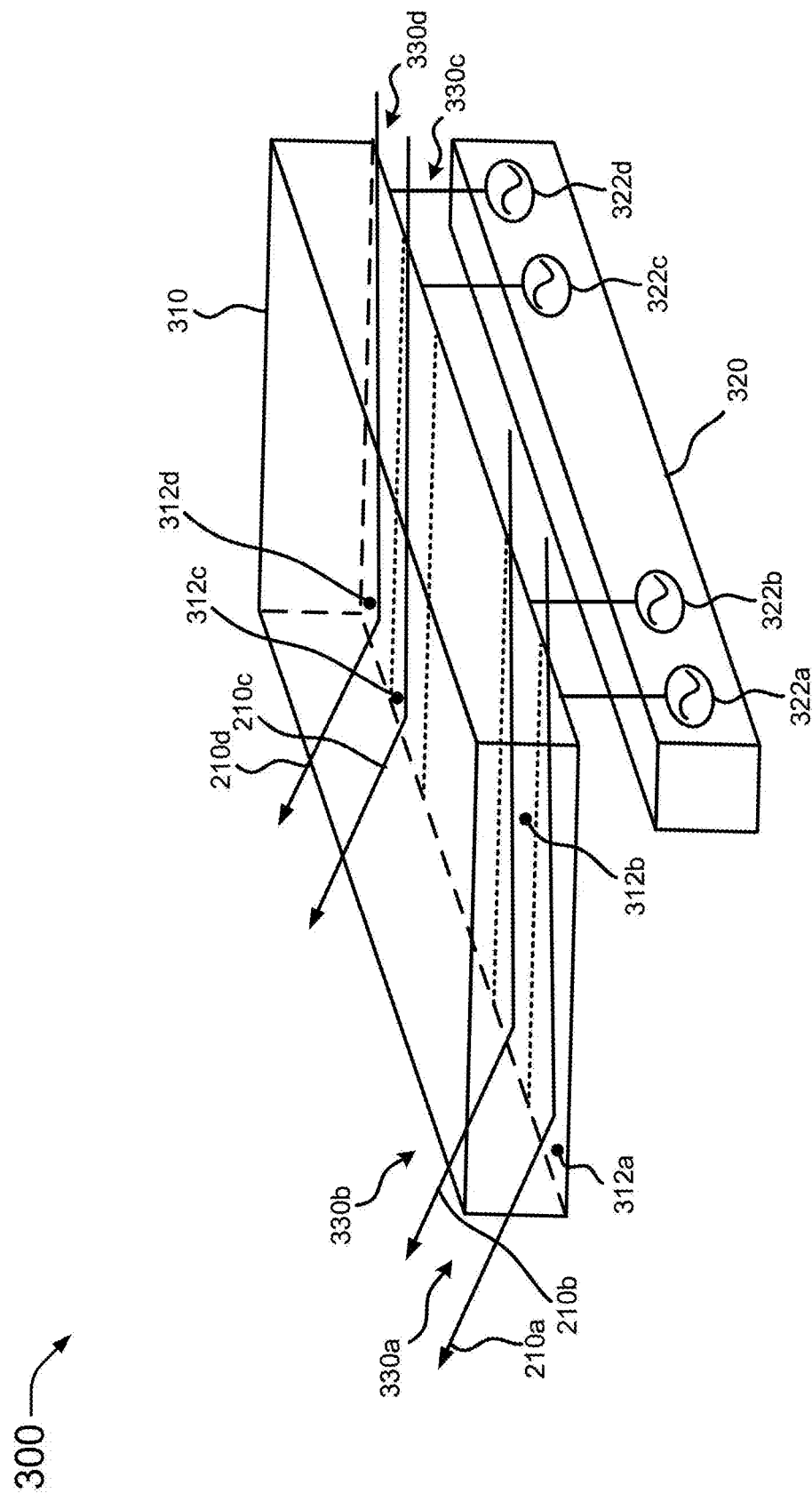
FIG. 3 is a diagram illustrating an example of a multi-channel acousto-optic modulator (AOM) with crosstalk compensation in accordance with aspects of this disclosure.

Turning now to FIG. 3, an example of a system 300 is shown that includes a multi-channel acousto-optic modulator (AOM) 310 configured to enable crosstalk compensation and having multiple channels 330 (e.g., channels 330*a-d*). The optical source or sources and the transmitted beams applied to the multi-channel AOM 310 is not shown for simplicity. Each channel may have associated with it a waveform generator for modulating (e.g., changing the characteristics) the optical beam deflected by that channel. For example, each channel may include a waveform generator that applies an RF signal (or "tone") to a transducer (e.g., antennas, traces or electrodes on an AOM crystal), which in turn applies an acoustic wave to the channel (e.g., forms a corresponding acoustic column for the channel in the AOM crystal). The waveform generator may be, for example, an AWG or a direct digital synthesizer that can be configured to generate complex RF signals, particularly those that may be needed to compensate for crosstalk effects. The applied acoustic wave may modulate the optical beam in the corresponding channel by vibrating a portion of the channel and changing the refraction index of the portion of the channel. In other words, the transducer may modulate the optical beam deflected by the channel by changing the amplitude and/or frequency of the acoustic wave. This modulation may also change characteristics of the optical beam in the respective channel.

In one instance, the AOM 310 may be a multi-channel Bragg cell having piezo-electric transducers 312*a-d* that locally apply acoustic waves to the AOM 310. The piezo-electric transducers 312*a-d* may be controlled by a controller 320 (which may be part of an optical controller 920 described below in connection with FIG. 9) having waveform generators 322*a-d*, one for each channel. The waveform generators 322*a-d* may be arbitrary waveform generators (AWGs) and/or direct digital synthesizers. The waveform generators 322*a-d* may apply RF signals (or "tones") of specific frequencies to generate acoustic waves. An RF tone may include multiple frequencies, but for simplicity of discussion, the RF tone may be said to be associated with a specific frequency (or single-frequency tone). The individual beams 210*a-d* may be provided to separately illuminate some of the trapped ions 110 to control aspects of the trapped ions, as shown above in connection with FIG. 2.

Still referring to FIG. 3, in certain implementations, the frequency, amplitude, and/or phase of each of the individual beams 210*a-d* may be modulated by AOM 310. For example, the waveform generator 322*a* may cause the transducer 312*a* to generate a first acoustic wave (e.g., a first acoustic column) having a first predetermined quality in the first channel 330*a*. The first acoustic wave generated by the transducer 312*a* may cause the deflected individual optical beam 210*a* to have a first frequency, a first phase, and/or a first amplitude. In another example, the waveform generator 322*b* may cause the transducer 312*b* to generate a second acoustic wave (e.g., a second acoustic column) having a second predetermined quality in the second channel 330*b*. The second acoustic wave generated by the transducer 312*b* may cause the deflected individual optical beam 210*b* to have a second frequency, a second phase, and/or a second amplitude. In another example, the waveform generator 322*c* may cause the transducer 312*c* to generate a third acoustic wave (e.g., a third acoustic column) having a third predetermined quality in the third channel 330*c*. The third acoustic wave generated by the transducer 312*c* may cause the deflected individual optical beam 210*c* to have a third frequency, a third phase, and/or a third amplitude. In yet another example, the waveform generator 322*d* may cause the transducer 312*d* to generate a fourth acoustic wave (e.g., a fourth acoustic column) having a fourth predetermined quality in the fourth channel 330*d*. The fourth acoustic wave generated by the transducer 312*d* may cause the deflected individual optical beam 210*d* to have a fourth frequency, a fourth phase, and/or a fourth amplitude. The multi-channel AOM 310 may include as few as two channels and as many as 32 channels or more, and each channel may have a corresponding waveform generator and transducer as described above. Moreover, also as described, each channel in the AOM 310 is configured to deflect light (e.g., deflect an optical or laser beam) and shift the frequency (or frequencies) in a time-dependent manner. Thus, when the transducer or antenna of a particular channel is driven by an RF tone of the right frequency, it launches an acoustic wave into the crystal of the AOM 310 forming an acoustic column, which modulates the index of refraction of the crystal such that light propagating through the resulting acoustic column is deflected into one or more beams.

In some aspects of the present disclosure, when a waveform generator, such as any of the waveform generators 322, applies an RF tone to generate an acoustic wave in a particular channel, a portion of the RF tone and/or the acoustic wave generated in that channel may "leak" into one or more neighboring channels (e.g., adjacent channel or nearby channel). For example, if the waveform generator 322*b* generates the second RF tone to generate the second acoustic wave in the second channel 330*b*, a portion of the second RF tone and/or a portion of the second acoustic wave may undesirably interact with the first channel 330*a*, the third channel 330*c*, and/or the fourth channel 330*d*. The portion of the second RF tone and/or the portion of the second acoustic wave that spills over into the other channels may interfere with one or more of the frequency, phase, and/or amplitude of at least one of the individual optical beams 210*a*, 210*c*, 210*d*, for example.

Figure 4:
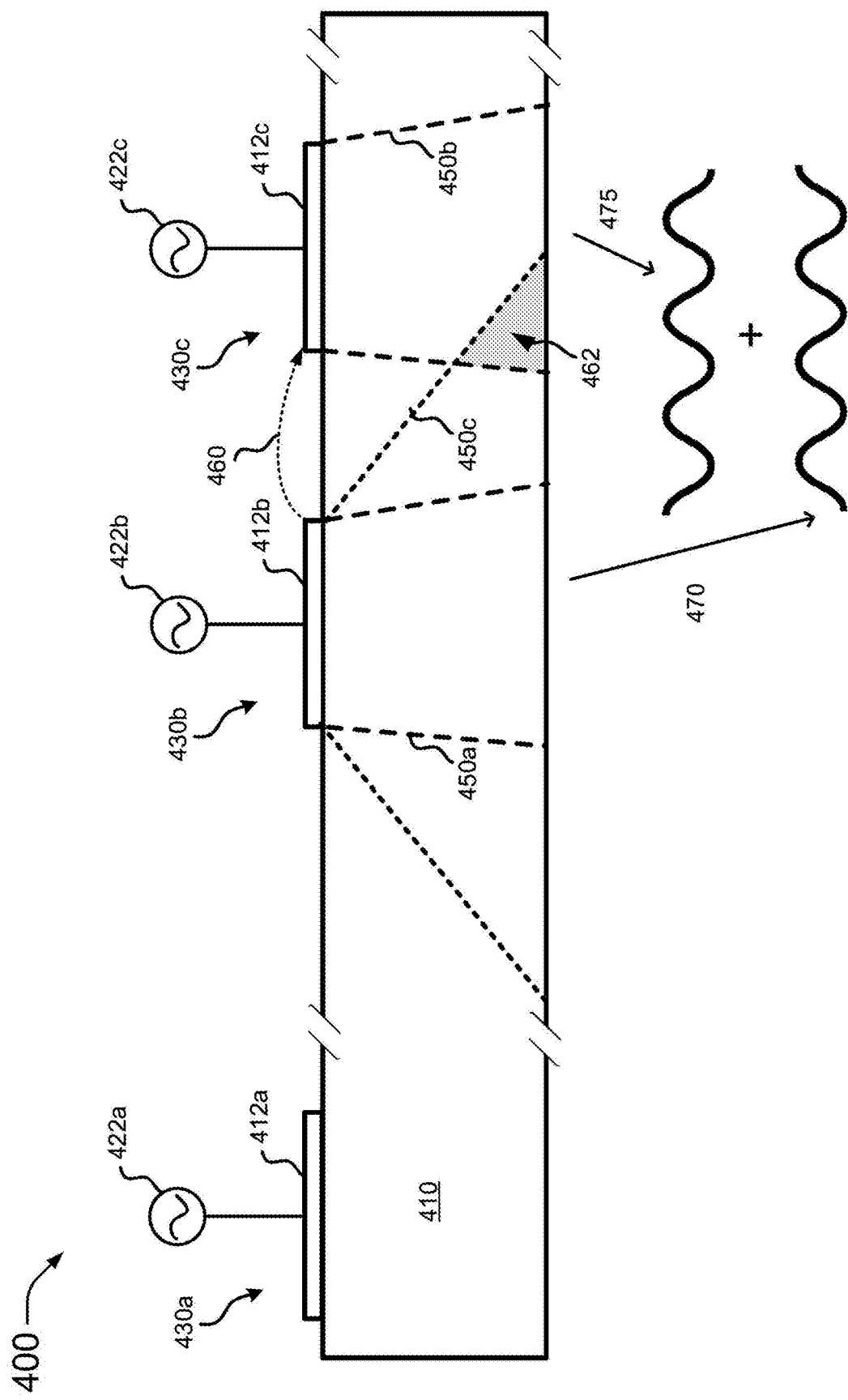
FIG. 4 is a diagram illustrating an example of an AOM system suppressing crosstalk using cancellation tones in accordance with aspects of the present disclosure.

As described above, the application of the second RF tone can cause crosstalk noise in an adjacent channel in two ways (for more detail see FIG. 4). One way is for the second RF tone to couple (e.g., RF coupling) into the transducer of an adjacent channel and therefore appear as if an RF tone is being applied into that transducer even though no such application is taking place. Another way is for the acoustic column that results from the application of the second RF tone to overlap with another channel and therefore appearing as if an acoustic column is being formed in that other channel even though no such acoustic column is intended to be formed.

In an illustrative example, a portion of the second RF tone and/or a portion of the second acoustic wave may undesirably interact with the third channel 330*c* causing what may be referred to as a crosstalk effect, crosstalk noise, or crosstalk error on the third channel 330*c*. The portion of the second RF tone that couples or interacts with the third channel 330*c* may be referred to as RF crosstalk, and the portion of the second acoustic wave that couples or interacts with the third channel 330*c* may be referred to as acoustic crosstalk. As described above, the RF crosstalk may result from electronic coupling between traces or electrodes in the second channel 330*b* and traces or electrodes in the third channel 330*c*. The acoustic crosstalk may result from spatial overlap of the wings or spreading of an acoustic column formed in the second channel 330*b* with an acoustic column formed in the third channel 330*c*. A portion of the crosstalk may be coherent crosstalk. Although incoherent crosstalk may also occur, it tends to occur through different mechanisms than those described herein. In some instances, the crosstalk may appear as a coherent drive signal (e.g., a sinusoidal wave) in the neighboring channel (e.g., the third channel 330*c*). The portion of the second RF tone and/or the portion of the second acoustic wave may cause unintentional vibration of the crystal in the third channel 330*c*, which may, in turn, cause one or more of the frequency, phase, and/or amplitude of the individual beam 210*c* to change undesirably. In one example, the second channel 330*b* may be turned on and the crosstalk may cause the third channel 330*c* to be unintentionally turned on, e.g., to deflect the light. The waveform generator 322*c* may provide a compensation RF tone that reduces, cancels, or eliminates the crosstalk effect caused by the portion of the second RF tone and/or the portion of the second acoustic wave. In one aspect of the present disclosure, the waveform generator 322*c* may provide a compensation RF tone that destructively interferes with a crosstalk effect caused by the second RF tone, and/or a compensation RF tone that generates a compensation acoustic wave that destructively interferes with a crosstalk effect caused by the second acoustic wave (explained in detail below).

It is to be understood that crosstalk noise may result in one channel by the application of RF tones or signals in one or more other nearby channels. It is also to be understood that the application of RF tones or signals in one channel may result in crosstalk noise in one or more other nearby channels. As noted above, the crosstalk noise may result from RF crosstalk, acoustic crosstalk, or a combination of the two.

Turning to FIG. 4, an example of an AOM 400 is shown that illustrates suppressing crosstalk using cancellation tones according to aspects of the present disclosure. FIG. 4 shows a cross-sectional view of the AOM 400, which is a multi-channel AOM and an example of the AOM 310 in the system 300 in FIG. 3. The AOM 400 may include a first channel 430*a*, a second channel 430*b*, and a third channel 430*c*, although additional channels may be present, where all the channels are formed on an AOM crystal 410. The AOM 400 may include a first waveform generator 422*a* configured to transmit a first RF tone to a first transducer 412*a* (e.g., to antennas, traces, or electrodes of the first transducer 412*a*) to generate a first acoustic wave. The AOM 400 may include a second waveform generator 422*b* configured to transmit a second RF tone to a second transducer 412*b* to generate a second acoustic wave. The AOM 400 may include a third waveform generator 422*c* configured to transmit a third RF tone to a third transducer 412*c* to generate a third acoustic wave.

During operation, in some instances, the second waveform generator 422*b* may transmit or apply the second RF tone to excite an acoustic column associated with the second acoustic wave that is generated in the second channel 430*b*. A typical acoustic column 450*a* (dashed lines) is a narrow column isolated or decoupled from another acoustic column such as an adjacent acoustic column 450*b* that may be separately excited in connection with the third channel 430*c*. The second RF tone may inadvertently cause a crosstalk effect in the third channel 430*c*. For example, the application of the second RF tone to the second transducer 412*b* may cause an RF crosstalk 460 and/or an acoustic crosstalk 462 that interacts with the third channel 430*c*. That is, the application of the second RF tone to the antennas, traces, or electrodes of the second transducer 412*b* may result in an RF coupling or RF crosstalk 460 with the traces or electrodes of the third transducer 412*c*. In such a case, a signal that is smaller but proportional to the second RF tone may appear to be applied to the third transducer 412*c* even though no such signal is being generated by the third waveform generator 422*c*. This coupled signal may be sufficiently strong to, for example, unintentionally turn on the third channel 430c and excite the acoustic column 450b, or change the characteristics of the acoustic column 450b if the third channel 430c is on.

In another example, the acoustic column associated with the second acoustic wave that is generated in the second channel 430b may not be confined to a narrow acoustic column 450a (dashed lines) but instead has components throughout a broad acoustic column 450c (dotted lines) that overlaps (shade) with a region where the acoustic column 450b is to be formed (or is formed if the third channel 430c is turned on). This overlap causes the second channel 430b to introduce an acoustic crosstalk 462 to the third channel 430c by either at least partially turning on the third channel 430c when the third channel 430c is off or by changing the characteristics of the acoustic column 450b when the third channel 430c is turned on. Note that the effect of the acoustic crosstalk 462 varies depending on where it happens in the third channel 430c. In this example, the acoustic crosstalk 462 occurs mostly on the left side of the third channel 430c such that the right side of the third channel 430c sees little to no acoustic crosstalk effects. It is to be understood that the RF crosstalk and the acoustic crosstalk discussed above may occur individually or in combination. The overall crosstalk effect produced by the second channel 430b on the third channel 430c can be illustrated by a signal 470.

To reduce the overall crosstalk effect on the third channel 430c caused by the RF crosstalk 460 and/or the acoustic crosstalk 462 (e.g., to reduce the overall crosstalk illustrated by the signal 470), the third waveform generator 422c may transmit or apply a compensation RF tone (also referred to as a correcting/correction RF signal). The compensation RF tone may generate a compensation acoustic tone. In one implementation, the compensation RF tone, and therefore the compensation acoustic tone generated from the compensation RF tone, may destructively interfere with the crosstalk effect and may cancel, reduce, or eliminate the crosstalk effect on the third channel 430c. This destructive interference may be illustrated by a signal 475 that is used to cancel the signal 470 that illustrates the crosstalk effect. The signal 475 is of about the same amplitude and inverse phase (i.e., 180°/π radian out of phase) as the crosstalk effect signal 470. This compensation RF tone may be applied by itself to turn the third channel "off", or applied along with the desired drive signal for the third channel.

It is to be understood that the compensation technique described in connection with FIG. 4 reflects a simple scenario in which two channels interact with each other. It may be the case that the compensation RF tone that is applied to reduce the crosstalk effect on one channel may cause its own crosstalk effect on an adjacent or nearby channel. Such a situation may require that multiple channels calculate or compute compensation RF tones, apply those compensation RF tones by themselves or with the desired drive signal, evaluate the effect of the compensation RF tones on the multiple channels, and iterate if necessary, by calculating or computing new compensation RF tones until an acceptable overall crosstalk reduction is achieved (e.g., a certain threshold level is met).

In certain implementations, the frequency, amplitude, phase delay, or other properties of the compensation or correction signals may be dependent on the temperature of the AOM crystal 410. For example, if the second waveform generator 422b generates and applies an RF tone that results in crosstalk (illustrated by the signal 470) in the third channel 430c, then the third waveform generator 422c may generate and apply a compensation or correction tone to destructively interfere (the signal 475) with the signal 470 and thereby reduce or eliminate the crosstalk effect. As the temperature of the AOM crystal 410 changes, the physical characteristics (e.g., amplitude) of the signal 475 may change (e.g., amplitude may increase or decrease) to adjust for the changes in the optical properties of the AOM crystal 410 with temperature such that the signal 475 can completely or near completely interfere with the signal 470 and thereby reduce or eliminate the crosstalk effect even as the temperature of the AOM crystal 410 changes. The physical characteristics of the signal 475 that may change can also include the frequency, phase delay, and/or other properties of the signal 475.

Figure 5:
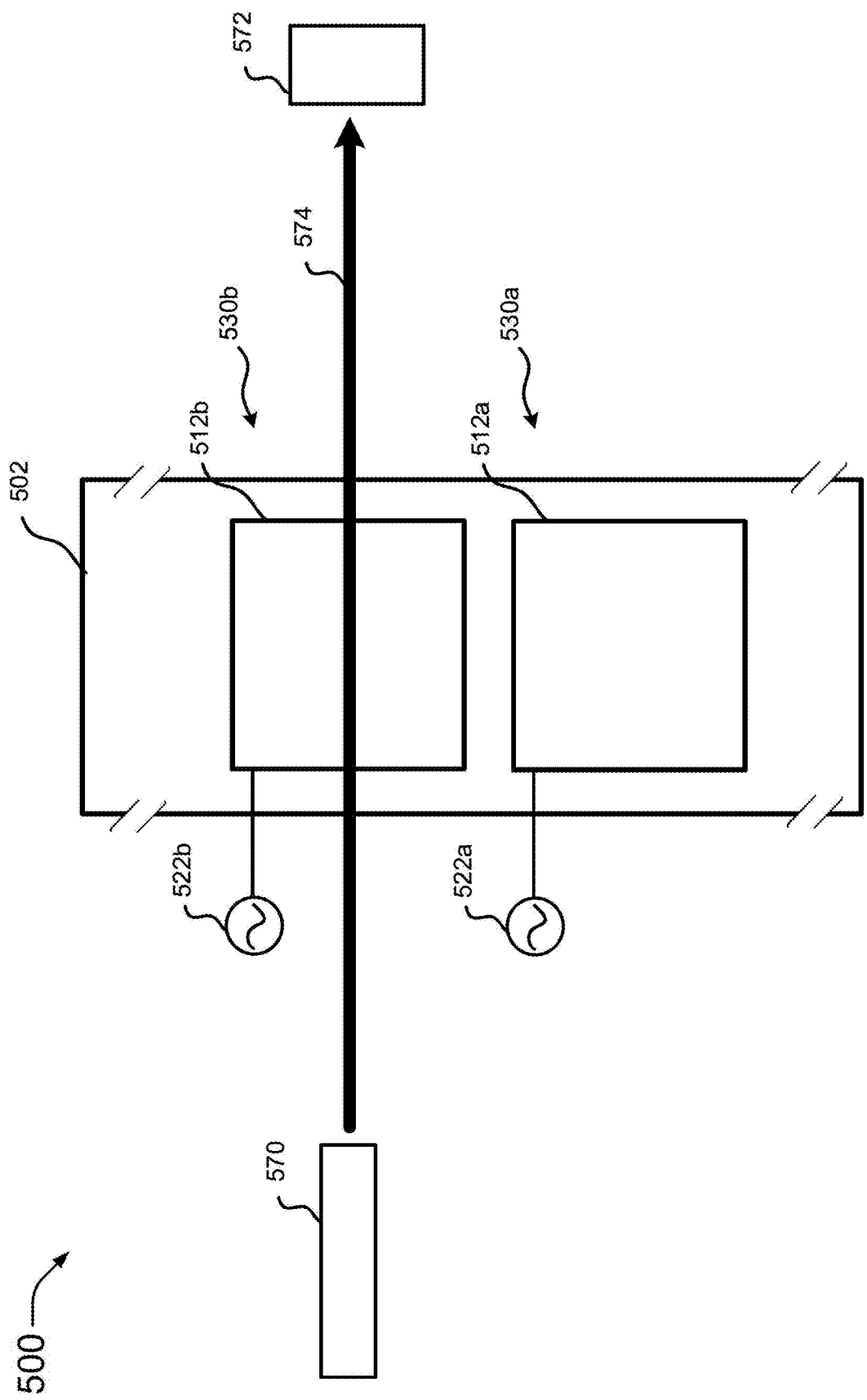
FIG. 5 is a diagram illustrating an example of an AOM system for measuring channel crosstalk in accordance with aspects of the present disclosure.

Referring now to FIG. 5, illustrated is an example of a system 500 for measuring channel crosstalk. The system 500 may include an AOM 502, an optical source 570, and a detector 572. The AOM 502 may be a multi-channel AOM and may be an example of the multi-channel AOMs 310 and 400 described above. The system 500 may include a first channel 530a and a second channel 530b. The system 500 may include a first waveform generator 522a configured to transmit a first RF tone to a first transducer 512a to generate a first acoustic wave associated with a corresponding acoustic column. The AOM system 500 may include a second waveform generator 522b configured to transmit a second RF tone to a second transducer 512b to generate a second acoustic wave associated with a corresponding acoustic column.

During operation to measure channel crosstalk, the optical source 570 may emit an optical beam 574. It is to be understood that the optical beam 574 may pass through various optical and/or optoelectronic devices before reaching the AOM 502. The detector 572 may detect the optical beam 574, including the optical properties of the optical beam 574, such as the amplitude, phase, and/or frequency of the optical beam 574. In some instances, during channel crosstalk measurement, the first waveform generator 522a may apply a first RF tone (e.g., at maximum power of the first waveform generator 522a) to the first channel 530a at a frequency f and zero phase (or some other reference phase). The first RF tone may be described by the equation $A \sin(2\pi f t + \Phi)$, where A is the amplitude of the first RF tone and $\Phi$ is the phase of the first RF tone (e.g., zero phase). The first RF tone may induce a crosstalk effect on the second channel 530b, which is off at the time. As described above, this crosstalk effect may be caused by one or both of an RF crosstalk (e.g., electrical coupling) or an acoustic crosstalk (e.g., acoustic column overlap). The crosstalk effect on the second channel 530b may cause the optical properties of the optical beam 574 to change, such as the amplitude, phase, and/or frequency of the optical beam 574. The detector 572 may detect the optical beam 574 and the change in the optical properties of the optical beam 574. The second waveform generator 522b may apply a compensation RF tone to the second channel 530b at the frequency f, which produces a corresponding compensation acoustic wave in the second channel 530b. The second waveform generator 522b may iteratively adjust (manually or automatically via a feedback) the amplitude and/or the phase of the compensation RF tone until the change in the optical properties of the optical beam 574 is minimized or substantially minimized for the frequency f. The compensation RF tone may be describe by the equation $A(a_{1 \to 2}) \sin(2\pi f t + \Phi + \Theta_{1 \to 2})$, where $a_{1 \to 2}$ is the amplitude adjustment factor of the compensation RF tone and $\Theta_{1 \to 2}$ is the phase adjustment factor of the compensation RF tone. In some examples, the process above may be repeated for one or more frequencies of the optical beam 574. In other non-limiting examples, the process above may be repeated for one or more channels (e.g., the first channel 530a) of the AOM 502.

In certain implementations, the compensation RF tone may have a lower amplitude than the first RF tone (i.e., $a_{1\to 2}$ is less than 1).

In some instances of the present disclosure, the compensation RF tone may correct RF crosstalk and/or acoustic crosstalk from more than one channel. The compensation RF tones may superimpose multiple amplitude adjustment factors and/or phase adjustment factors from a plurality of channels. That is, a compensation or correction RF tone or signal may be configured to correct for a combined crosstalk effect resulting from the interactions of multiple channels.

In certain implementation, the compensation RF tone may be superimposed onto the second RF tone applied by the second waveform generator 522b.

In some aspects of the present disclosure, the compensation RF tone may be adjusted depending on the location of the optical beam 574 within the second channel 530b. For example, if the optical beam 574 is closer to the first channel 530a (i.e., where there may be higher RF and/or acoustic crosstalk noise), the compensation RF tone may have higher energy. If the optical beam 574 is farther from the first channel 530a (i.e., where there may be lower RF and/or acoustic crosstalk noise), the compensation RF tone may have lower energy.

In an implementation, the detector 572 may be a photodiode, a photodetection system, an atom, or a trapped ion in a chain like the chain 110 described above. For example, the detector 572 can be a photodiode that captures a large area or a photodiode that detects a portion of a field through an aperture, or a photodiode that responds to low light levels such as a PIN photodiode or avalanche photodiode or one with lower responsivity.

In other implementations, the system 500 may be integrated into a quantum computer to perform in-situ measurement/calibration to generate the compensation RF tones for each channel of the AOM 502. The compensation RF tone may reduce the crosstalk between different channels and therefore reduce errors or increase the fidelity of the quantum gates implemented in a quantum computer.

In some examples of the present disclosure, the compensation RF tones may cancel other crosstalk signals, such as crosstalk signals from non-adjacent (e.g., non-spatially adjacent) channels in an AOM. For example, the effects of a channel that is two or more channels apart from the affected channel may be canceled using the appropriate compensation RF tone.

In an implementation, the signals measured by the detector 572 may be smoothed or averaged to reduce measurement noise. In such a case, multiple measurements may be made and smoothed or averaged over time.

In certain implementations, the compensation RF tones may cancel coherent crosstalk noises from physical mechanisms other than electronic coupling, acoustic overlap, or a combination of the two. Examples of the physical mechanisms may include ambient noise, temperature fluctuations, etc.

In certain implementations, the crosstalk measurements may be performed in one AOM and those measurements may be used with another similar AOM. For example, one AOM may be already part of or integrated with (e.g., installed) a quantum computer or QIP system and a different, separate AOM may be used for testing and the results from that testing may be deemed to be applicable when performing crosstalk cancelation operations in connection with the integrated AOM.

In some instances, some or all components of the system 500 may be integrated into the system 300 (FIG. 3) to perform real-time or near real-time measurement, calibration, and/or noise cancellation/compensation that reduces or eliminates the types of crosstalk effects, noise, or errors described herein. For example, during operation (e.g., of a QIP system as described below) the system 300 may include the detector 572 to detect or measure various aspects of one or more of the optical beams 210. If the RF tone of one channel causes crosstalk in another channel (which may cause changes in the optical characteristics of the optical beam in the other channel, such as phase, amplitude, frequency, etc.), the waveform generator of the other channel may apply a compensation tone in real time or near real-time to minimize the changes in the optical characteristics of the optical beam. It is to be understood that these crosstalk effects can be from one channel to another channel, from one channel to several other channels, from several channels to one channel, and from several channels to several other channels, and therefore there may be a need to determine multiple model parameters to be used when certain channels are used to compensate for their effects on other channels. Generally, a model of the multi-channel AOM crosstalk effects can be obtained or determined from first principles (e.g., physical and mathematical analysis) and by performing experiments, tests, and/or measurements to determine the appropriate parameters for the model. This, however, can be challenging, particularly when the number of channels in the multi-channel AOM is large. A different approach may be to use an inferred model generated by, for example, training a model based on one or more neural networks. In this approach, many different scenarios are presented to train the model and obtain the appropriate parameters of the model. The neural network-based model, just like the first principles model, is then used to generate and apply the appropriate compensation signals for a particular scenario. For example, when RF tones are applied to one or more channels, the model may be used to determine which channels would be affected and the compensation signal that is needed in each affected channel to reduce or eliminate crosstalk effects.

In some implementations, the measurements of the overall crosstalk and the characterizations of the corresponding compensation or correction tones may be automated using a neural network-based model that is implemented as part of a quantum computer or QIP system. The neural network-based model may be used to generate and apply RF tones having varying frequencies, amplitudes, and/or phases on the channels of the AOM 502 and measurements of the overall crosstalk effects (e.g., changes in the phase, amplitude, and/or frequency of the optical beams 210) on other channels of the AOM 502 may be fed back to the neural network-based model to optimize its performance. The neural network-based model, just like the first principles model, may minimize the crosstalk effects by applying compensation RF tones of varying frequencies, amplitudes, and/or phases (a functional dependence on the frequencies, amplitudes, and/or phases of the applied RF tones).

Moreover, aspects of the system 500 may be applicable to the scenario described above in which the compensation RF tone that is applied to reduce the crosstalk effect on one channel may cause its own crosstalk effect on an adjacent or nearby channel, where such situation may also involve multiple channels and the need to iteratively compute or calculate compensation RF tones in the multiple channels until an acceptable overall crosstalk reduction is achieved (e.g., the crosstalk effect in each of the channels is below a certain level).

Figure 6:
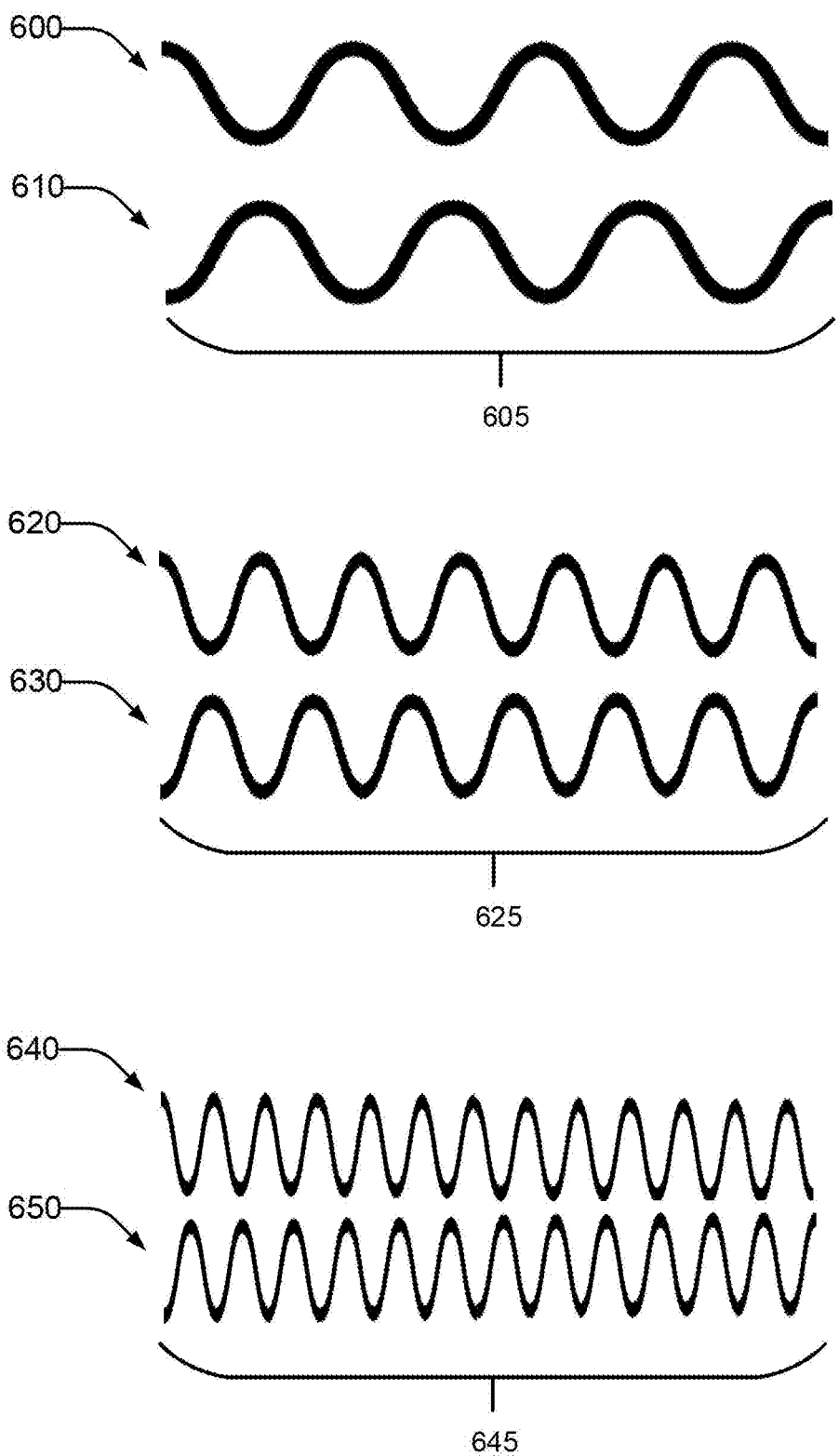
FIG. 6 shows diagrams illustrating an example of frequency dependence of the compensation tone in accordance with aspects of the present disclosure.

Turning now to FIG. 6, and referencing FIG. 4, in some implementations, the waveform generators 422 (e.g., AWGs and/or direct digital synthesizers) may generate signals that are frequency dependent or frequency varying. Specifically, the frequency, amplitude, phase delay, or other properties of the compensation signals may be dependent on the frequency (or frequencies) of the crosstalk signals. In one aspect of the present disclosure, the first waveform generator 422a may generate and apply a first RF tone to generate a first acoustic column in the first channel 430a. The first RF tone may cause an RF crosstalk that generates an acoustic crosstalk in the second channel 430b. The overall crosstalk effect produced by the first channel 430a on the second channel 430b can be illustrated by a signal 600. The signal 600 may have a first frequency 605. The second waveform generator 422b may generate and apply a first compensation RF tone. The first compensation RF tone may generate a first compensation acoustic tone. The first compensation acoustic tone may reduce and/or cancel the acoustic crosstalk in the second channel 430b. The first compensation acoustic tone may be illustrated by a signal 610. The signal 610 may have the first frequency 605. The signal 610 may destructively interfere with the signal 600.

In one aspect of the present disclosure, the first waveform generator 422a may generate and apply a second RF tone to generate a second acoustic column in the first channel 430a. The second RF tone may cause an RF crosstalk that generates an acoustic crosstalk in the second channel 430b. The overall crosstalk effect produced by the first channel 430a on the second channel 430b can be illustrated by a signal 620. The signal 620 may have a second frequency 625. The second waveform generator 422b may generate and apply a second compensation RF tone. The second compensation RF tone may generate a second compensation acoustic tone. The second compensation acoustic tone may reduce and/or cancel the acoustic crosstalk in the second channel 430b. The second compensation acoustic tone may be illustrated by a signal 630. The signal 630 may have the second frequency 625. The signal 630 may destructively interfere with the signal 620.

In some aspects of the present disclosure, the first waveform generator 422a may generate and apply a third RF tone to generate a third acoustic column in the first channel 430a. The third RF tone may cause an RF crosstalk that generates an acoustic crosstalk in the second channel 430b. The overall crosstalk effect produced by the first channel 430a on the second channel 430b can be illustrated by a signal 640. The signal 640 may have a third frequency 645. The second waveform generator 422b may generate and apply a third compensation RF tone. The third compensation RF tone may generate a third compensation acoustic tone. The third compensation acoustic tone may reduce and/or cancel the acoustic crosstalk in the second channel 430b. The third compensation acoustic tone may be illustrated by a signal 650. The signal 650 may have the third frequency 645. The signal 650 may destructively interfere with the signal 640.

It is to be understood that the crosstalk effect on a particular channel may be caused by multiple signals of different frequencies (e.g., from different channels). In such a case, the waveform generator for the channel being affected may provide a combined compensation signal to cancel the crosstalk effect caused by signals with different frequencies. An AWG or a direct digital synthesizer may be configurable to generate such signals.

Figure 7:
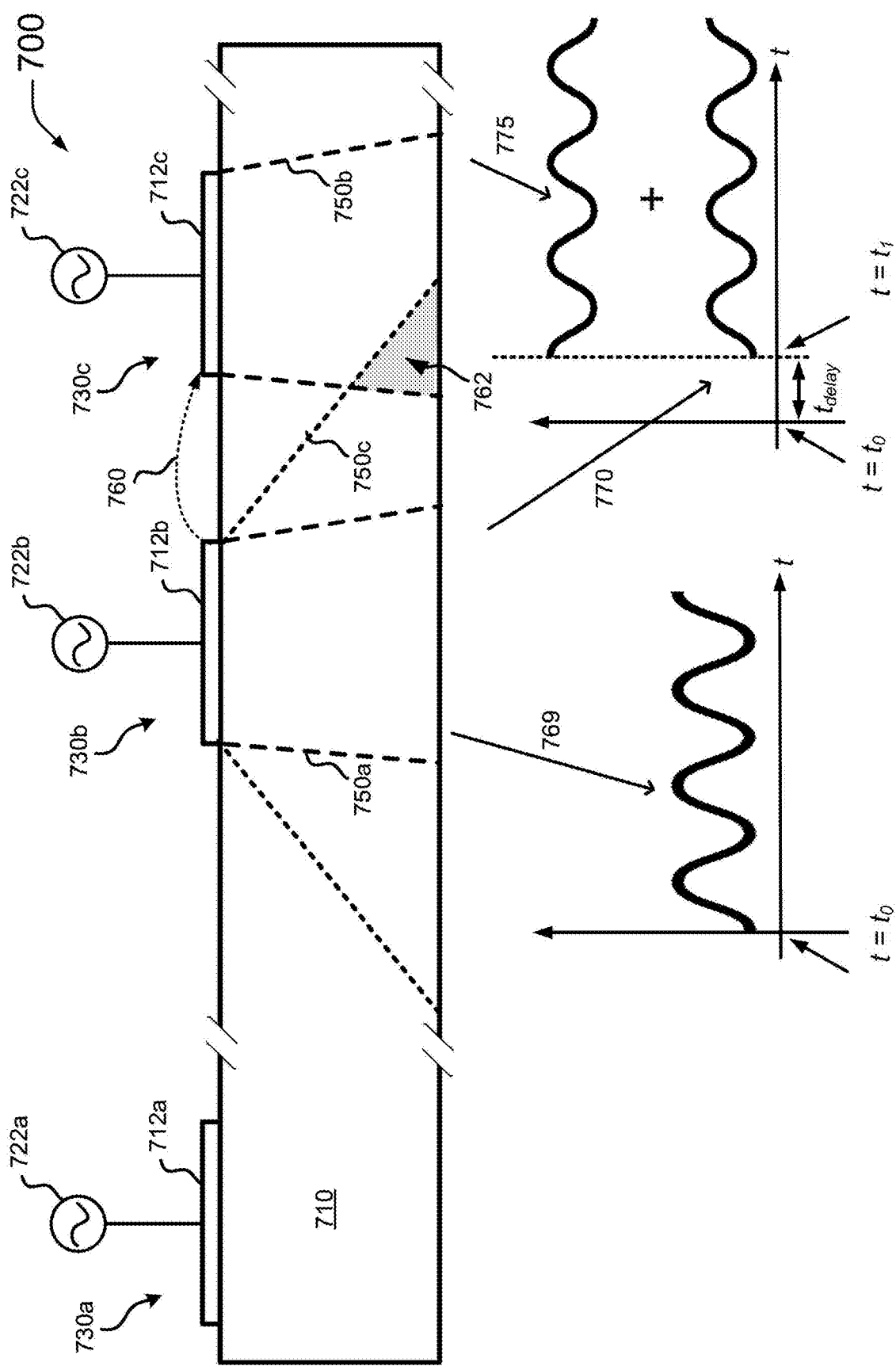
FIG. 7 is a diagram illustrating an example of an AOM system suppressing crosstalk using time-delayed cancellation tones in accordance with aspects of the present disclosure.

Turning to FIG. 7, an example of an AOM 700 illustrates suppressing time-delayed crosstalk using cancellation tones according to aspects of the present disclosure. FIG. 7 shows a cross-sectional view of the AOM 700, which is a multi-channel AOM and an example of the AOM 310 in the system 300 in FIG. 3. The AOM 700 may include a first channel 730a, a second channel 730b, and a third channel 730c, although additional channels may be present, where all the channels are formed on an AOM crystal 710. The AOM 700 may include a first waveform generator 722a (e.g., an AWG or a direct digital synthesizer) configured to generate and apply a first RF tone to a first transducer 712a (e.g., to antennas, traces, or electrodes of the first transducer 712a) to generate a first acoustic wave. The AOM 700 may include a second waveform generator 722b configured to generate and apply a second RF tone to a second transducer 712b to generate a second acoustic wave. The AOM 700 may include a third waveform generator 722c configured to generate and apply a third RF tone to a third transducer 712c to generate a third acoustic wave.

During operation, in some instances, the second waveform generator 722b may transmit or apply the second RF tone to excite an acoustic column associated with the second acoustic wave that is generated in the second channel 730b. A typical acoustic column 750a (dashed lines) is a narrow column isolated or decoupled from another acoustic column such as an adjacent acoustic column 750b that may be separately excited in connection with the third channel 730c. The second RF tone may unintendedly cause a crosstalk effect in the third channel 730c. For example, the application of the second RF tone to the second transducer 712b may cause an RF crosstalk 760 and/or an acoustic crosstalk 762 that interacts with the third channel 730c. That is, the application of the second RF tone to the antennas, traces, or electrodes of the second transducer 712b may result in an RF coupling or RF crosstalk 760 with the antennas, traces, or electrodes of the third transducer 712c. In such a case, a signal that is smaller but proportional to the second RF tone may appear to be applied to the third transducer 712c even though no such signal is being generated by the third waveform generator 722c. This coupled signal may be sufficiently strong to, for example, unintentionally turn on the third channel 730c and excite the acoustic column 750b, or change the characteristics of the acoustic column 750b if the third channel 730c is on.

In another example, the acoustic column associated with the second acoustic wave that is generated in the second channel 730b may not be a narrow acoustic column 750a (dashed lines) but instead it is a broad acoustic column 750c (dotted lines) that overlaps (shade) with a region where the acoustic column 750b is to be formed. This overlap causes the second channel 730b to introduce an acoustic crosstalk 762 to the third channel 730c by either at least partially turning on the third channel 730c when the third channel 730c is off or by changing the characteristics of the acoustic column 750b when the third channel 730c is turned on. Note that the effect of the acoustic crosstalk 762 varies depending on where it happens in the third channel 730c. In this example, the acoustic crosstalk 762 occurs mostly on the left side of the third channel 730c such that the right side of the third channel 730c sees little to no acoustic crosstalk effects. It is to be understood that the RF crosstalk and the acoustic crosstalk discussed above may occur individually or in combination.

In some instances, the second waveform generator 722b may generate the second RF tone at an initial time $t=t_0$. The second RF tone may be illustrated by a signal 769. The application of the second RF tone to the second transducer 712b may cause the RF crosstalk 760 and/or the acoustic crosstalk 762 that interacts with the third channel 730c. The overall crosstalk effect produced by the second channel 730b on the third channel 730c can be illustrated by a signal 770. However, the overall crosstalk effect may not begin at the initial time $t=t_0$ because the RF crosstalk 760 and/or the acoustic crosstalk 762 may take time to propagate from the second channel 730b to the third channel 730c. That is, there may be a physical delay between the application of the second RF tone to the second transducer 712b and when the crosstalk effect manifests itself in the third channel 730c. Therefore, the signal 770 representing the overall crosstalk effect may begin at $t=t_1$, after a time delay $t_{delay}$. In one example, the RF crosstalk 760 may arrive at the third channel 730c before the acoustic crosstalk 762. When both RF crosstalk and acoustic crosstalk are present and there is a difference in how fast each manifests itself, the timing of the application of a compensation tone to the third channel 730c may be based on when the combined crosstalk effect more strongly manifests itself. It is possible to apply two different compensations tones in this case, each with a different amplitude, one tone for the acoustic crosstalk and another tone for the RF crosstalk.

To reduce the overall crosstalk effect on the third channel 730c caused by the RF crosstalk 760 and/or the acoustic crosstalk 762 (e.g., to reduce the overall crosstalk illustrated by the signal 770), the third waveform generator 722c may transmit or apply a compensation RF tone. The third waveform generator 722c may transmit or apply the compensation RF tone at $t=t_1$ to account for the time delay $t_{delay}$ of the RF crosstalk 760 and/or the acoustic crosstalk 762, or transmit or apply the compensation RF tone with a phase shift (equaling to the $t_{delay}$) to account for the time delay $t_{delay}$. The compensation RF tone may generate a compensation acoustic tone. In one implementation, the compensation RF tone, and therefore the compensation acoustic tone generated from the compensation RF tone, may destructively interfere with the crosstalk effect and may cancel, reduce, or eliminate the crosstalk effect on the third channel 730c. This destructive interference may be illustrated by a signal 775 that is used to cancel the signal 770 that illustrates the crosstalk effect. The signal 775 is of about the same amplitude and inverse phase (i.e., 180°/π radian out of phase) as the crosstalk effect signal 770.

It is to be understood that a channel may be affected by one or more channels and the effect of each of these channels may have a different delay. For example, adjacent channels (e.g., immediately next channels) to either side of the affected channel may produce a crosstalk effect with same or similar delays, however, more distant channels may produce a crosstalk effect with greater delays.

Figure 8:
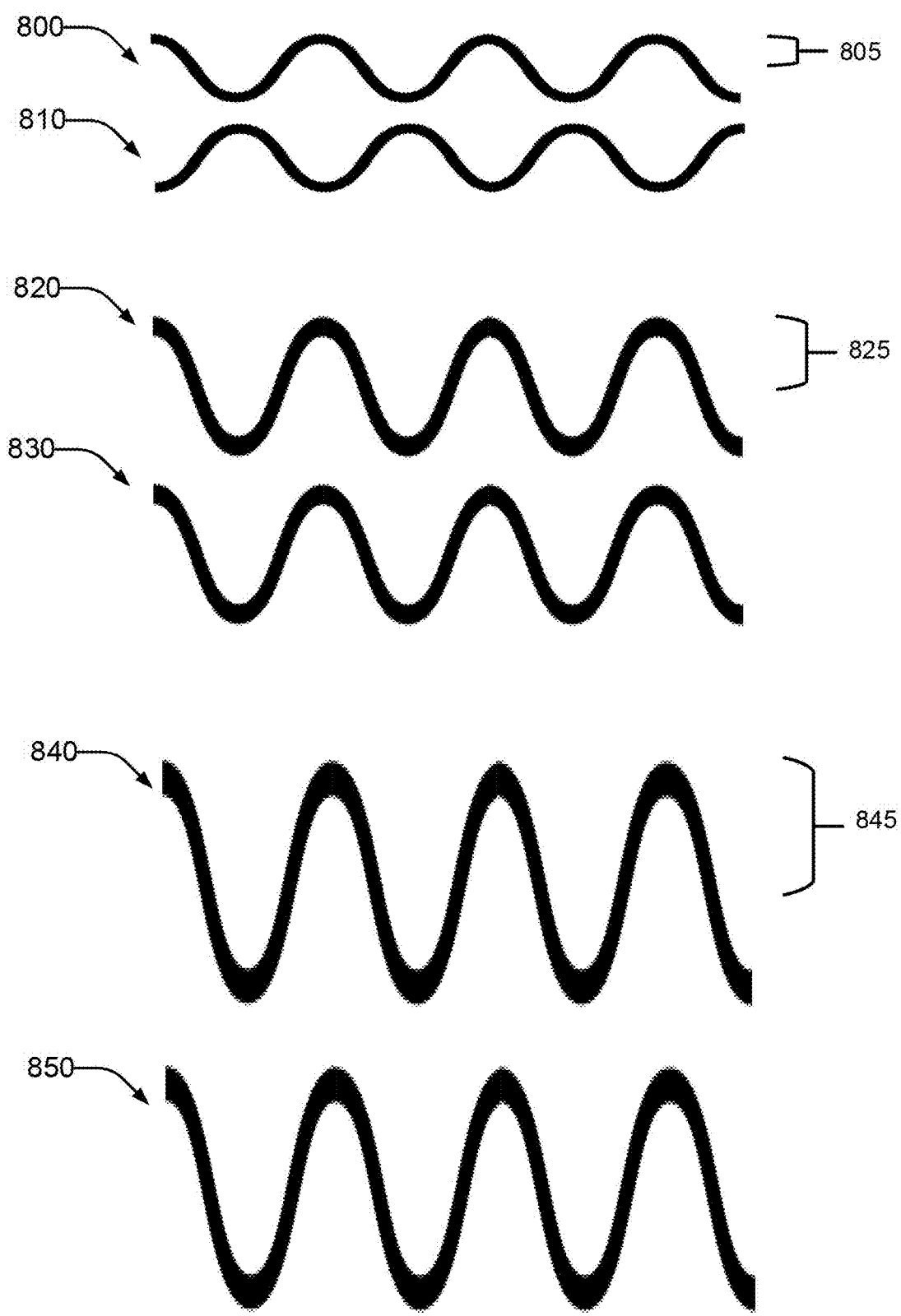
FIG. 8 shows diagrams illustrating an example of amplitude dependence of the compensation tone in accordance with aspects of the present disclosure.

Turning now to FIG. 8, and referencing FIG. 4, in some implementations, the waveform generators 422 (e.g., AWGs and/or direct digital synthesizers) may generate signals that are amplitude dependent or amplitude varying. Specifically, the frequency, amplitude, phase delay, or other properties of the compensation signals may be dependent on the amplitude (or power) of the crosstalk signals or crosstalk effects. In one aspect of the present disclosure, the first waveform generator 422a may generate and apply a first RF tone to generate a first acoustic column in the first channel 430a. The first RF tone may cause an RF crosstalk that generates an acoustic crosstalk in the second channel 430b. The overall crosstalk effect produced by the first channel 430a on the second channel 430b can be illustrated by a signal 800. The signal 800 may have a first amplitude 805. The second waveform generator 422b may generate and apply a first compensation RF tone. The first compensation RF tone may generate a first compensation acoustic tone. The first compensation acoustic tone may reduce and/or cancel the acoustic crosstalk in the second channel 430b. The first compensation acoustic tone may be illustrated by a signal 810. The signal 810 may have the first amplitude 805. The signal 810 may destructively interfere with the signal 800.

In one aspect of the present disclosure, the first waveform generator 422a may generate and apply a second RF tone to generate a second acoustic column in the first channel 430a. The second RF tone may cause an RF crosstalk that generates an acoustic crosstalk in the second channel 430b. The overall crosstalk effect produced by the first channel 430a on the second channel 430b can be illustrated by a signal 820. The signal 820 may have a second amplitude 825. The second waveform generator 422b may generate and apply a second compensation RF tone. The second compensation RF tone may generate a second compensation acoustic tone. The second compensation acoustic tone may reduce and/or cancel the acoustic crosstalk in the second channel 430b. The second compensation acoustic tone may be illustrated by a signal 830. The signal 830 may have the second amplitude 825. The signal 830 may destructively interfere with the signal 820.

In some aspects of the present disclosure, the first waveform generator 422a may generate and apply a third RF tone to generate a third acoustic column in the first channel 430a. The third RF tone may cause an RF crosstalk that generates an acoustic crosstalk in the second channel 430b. The overall crosstalk effect produced by the first channel 430a on the second channel 430b can be illustrated by a signal 840. The signal 840 may have a third amplitude 845. The second waveform generator 422b may generate and apply a third compensation RF tone. The third compensation RF tone may generate a third compensation acoustic tone. The third compensation acoustic tone may reduce and/or cancel the acoustic crosstalk in the second channel 430b. The third compensation acoustic tone may be illustrated by a signal 850. The signal 850 may have the third amplitude 845. The signal 850 may destructively interfere with the signal 840.

The examples shown in FIG. 8 illustrate cases where the amount of the crosstalk effect may be proportional to the amount of power or amplitude of the RF tone applied to the channel causing the effect. Consequently, the amount of power or amplitude of the compensation tone or correction signal applied to the affected channel is also proportional to the amount of power or amplitude of the RF tone.

In some implementations, there may exist a non-linear effect between the energy of the RF tone that produces the crosstalk (e.g., RF and/or acoustic) and the energy of the crosstalk that is produced. For example, an RF tone that produces crosstalk signal having an amplitude of α may be compensated by a compensation RF tone that produces a compensation signal having the same amplitude of α. The correlation between the RF tone and the compensation RF tone may be linear up to a certain threshold, i.e., crosstalk signals having an amplitude of 2α, 3α, 4α . . . , nα may be compensated by compensation signals having an amplitude of 2α, 3α, 4α . . . , nα, respectively). It is to be understood that integer multiples of α as described above are merely by way of illustration and a may be scaled by non-integer values as well. As the amplitude of the crosstalk signal reaches a certain value, a saturation state may occur where the amplitude of the crosstalk signal does not increase with an increase in the RF tone and therefore the compensation signal need not be increased further to perform compensation/cancellation. That is, a stronger (e.g., larger energy or amplitude) RF tone will not cause the crosstalk effect to increase and as the crosstalk effect saturates the compensation signal can remain the same.

Figure 9:
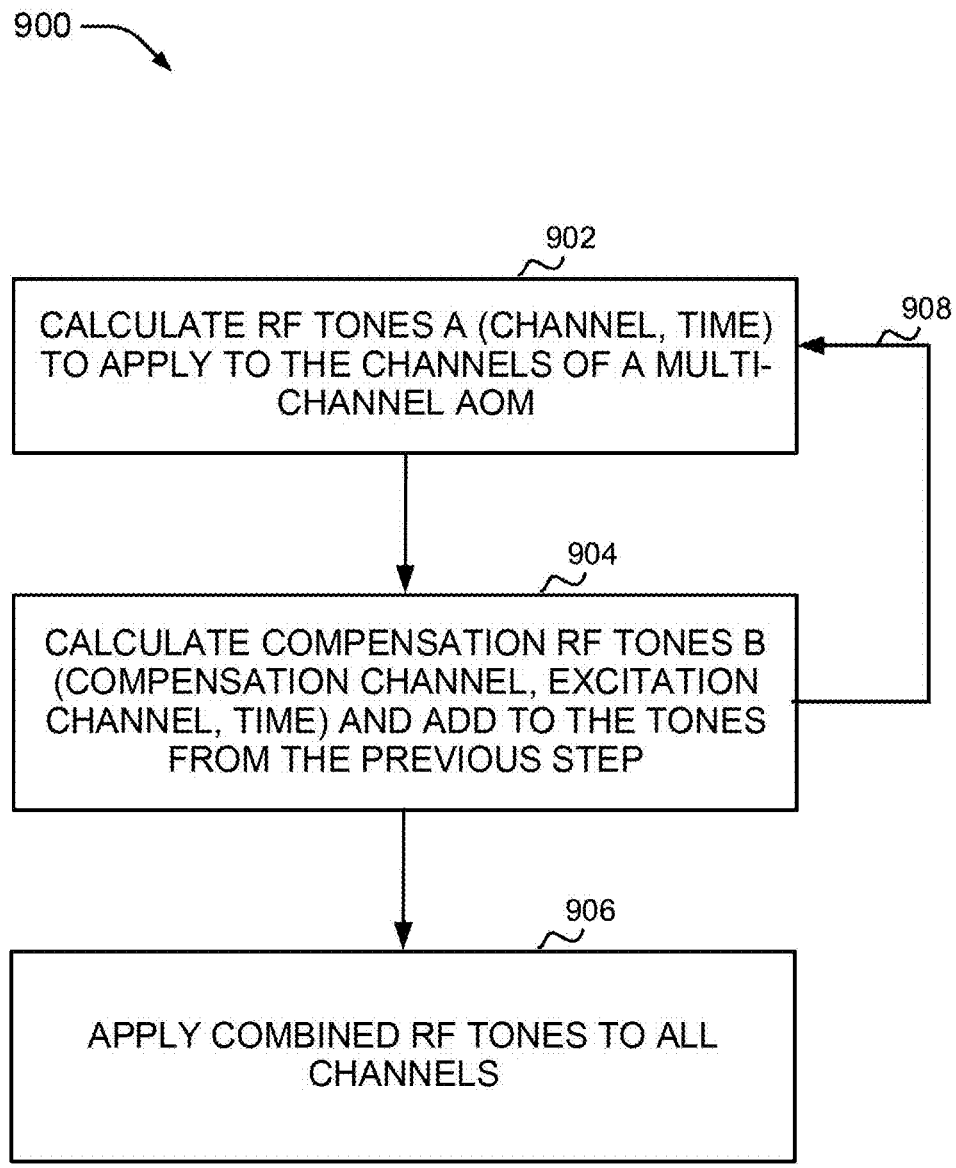
FIG. 9 is a flow diagram that illustrates using cancellation or compensation tones to the channels of an AOM to suppress crosstalk in accordance with aspects of the disclosure.

Referring to FIG. 9, a method or flow diagram 900 is described that illustrates the application of cancellation or compensation tones to the channels of an AOM to suppress crosstalk in accordance with aspects of the disclosure. The method 900 may be performed in a computer system such as a computer system or device 1300 described below with respect to FIG. 13, where, for example, a processor 1310, a memory 1320, a data store 1340, and/or an operating system 1360 may be used to perform the functions of the method 900. Similarly, the functions of the method 900 may be performed by one or more components of a QIP system such as a QIP system 1200 described below and its components (e.g., the optical controller 1220, a crosstalk controller 1240, and/or their subcomponents).

At block 902, the method 900 may include calculating RF waves or tones for all channels of the multi-channel AOM (e.g., initial RF waves or tones A calculated in connection with channel and time). Using compensation corrections such as those determined by the techniques described above in relation to FIGS. 4 and 5, compensation RF waves are calculated for these initial RF waves at block 904 (e.g., compensation RF waves or tones B calculated in connection with compensation channel, excitation channel and time). These compensation RF waves or tones are then added to the initial RF waves or tones for each channel. Since the compensation RF waves or tones themselves may generate crosstalk, this compensation RF wave or tone calculation may be performed one or more times 908 (e.g., in an iterative manner). Finally, at block 906, the calculated RF waves or tones (e.g., combined initial RF wave or tone in addition to an optimized compensation RF wave or tone) that reduce the effect of the RF crosstalk and/or the acoustic crosstalk on all channels may be applied to the multi-channel AOM.

Figure 10:
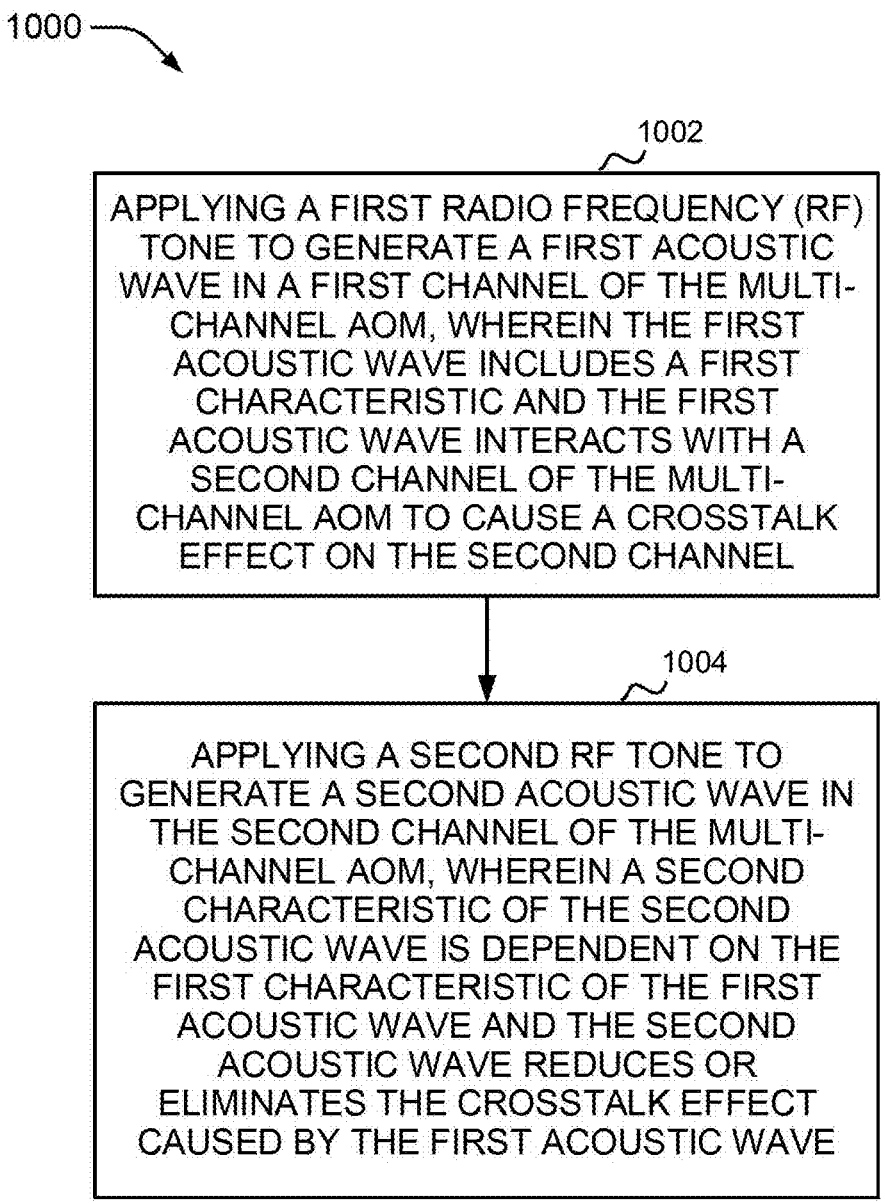
FIG. 10 is a flow diagram that illustrates an example of a method in accordance with aspects of this disclosure.

Referring to FIG. 10, a method 1000 of operating a multi-channel AOM to compensate for coherent crosstalk noise may be performed in a computer system such as the computer system or device 1300 described above, where, for example, the processor 1310, the memory 1320, the data store 1340, and/or the operating system 1360 may be used to perform the functions of the method 1000. Similarly, the functions of the method 1000 may be performed by one or more components of a QIP system such as the QIP system 1200 and its components (e.g., the optical controller 1220, the crosstalk controller 1240, and/or their subcomponents).

At block 1002, the method 1000 may include applying a first radio-frequency (RF) tone to generate a first acoustic wave in a first channel of the multi-channel AOM, wherein the first acoustic wave includes a first characteristic and the first acoustic wave interacts with a second channel of the multi-channel AOM to cause a crosstalk effect on the second channel. For example, the first waveform generator 422a may transmit a first RF tone to generate a first acoustic column in the first channel 430a. The first RF tone may cause an RF crosstalk that generates an acoustic crosstalk in the second channel 430b. The overall crosstalk effect produced by the first channel 430a on the second channel 430b can be illustrated by the signal 600. The signal 600 may have the first frequency 605.

At block 1004, the method 1000 may include applying a second RF tone to generate a second acoustic wave in the second channel of the multi-channel AOM, wherein a second characteristic of the second acoustic wave is dependent on the first characteristic of the first acoustic wave and the second acoustic wave reduces or eliminates the crosstalk effect caused by the first acoustic wave. For example, the second waveform generator 422b may transmit a first compensation RF tone. The first compensation RF tone may generate a first compensation acoustic tone. The first compensation acoustic tone may reduce and/or cancel the acoustic crosstalk in the second channel 430b. The first compensation acoustic tone may be illustrated by a signal 610. The signal 610 may have the first frequency 605. The signal 610 may destructively interfere with the signal 600. The frequency of the signal 610 may be dependent on the frequency of the signal 600.

In an aspect of the method 1000, wherein applying the first RF tone turns on the first channel, and applying the second RF tone reduces or eliminates the crosstalk effect such that turning on the first channel does not cause the second channel to unintentionally be turned on by the first RF tone.

In another aspect of the method 1000, further comprising measuring the crosstalk effect of the first acoustic wave.

In certain aspect of the method 1000, wherein measuring the crosstalk effect further comprises measuring the crosstalk effect using a photodiode or a trapped ion aligned to detect an optical beam deflected from the second channel.

In some aspects of the method 1000, further comprising adjusting, while measuring the crosstalk effect, the second RF tone to minimize the crosstalk effect.

In a non-limiting aspect of the method 1000, further comprising adjusting the second RF tone to adjust the second characteristic of the second acoustic wave based on the first characteristic.

In some aspects of the method 1000, wherein the first characteristic or the second characteristic include at least one of a frequency, a phase, or an amplitude.

In one aspect of the method 1000, wherein applying the second RF tone further comprises applying the second RF tone after a time delay equaling to a time difference between a first time of applying the first RF tone and a second time of the first acoustic wave causing the crosstalk effect.

In an aspect of the method 1000, further comprising adjusting the second RF tone to be smaller than and proportional to an amplitude of the first RF tone and a phase of the second RF tone to be an inverse of a phase of the first RF tone.

Figure 11:
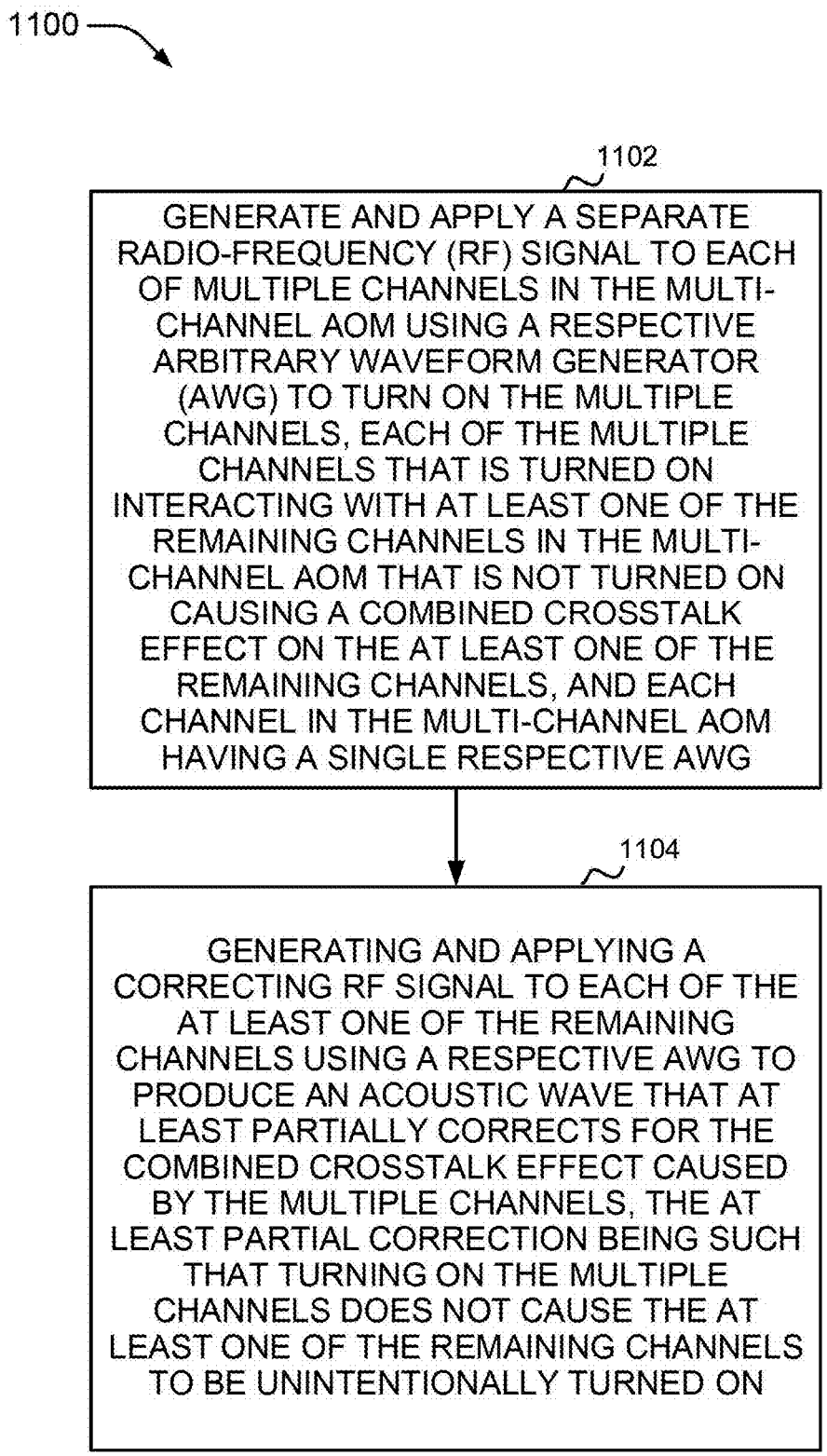
FIG. 11 is a flow diagram that illustrates an example of another method in accordance with aspects of this disclosure.

Referring to FIG. 11, a method 1100 of operating a multi-channel AOM to compensate for coherent crosstalk noise may be performed in a computer system such as the computer system or device 1300 described above, where, for example, the processor 1310, the memory 1320, the data store 1340, and/or the operating system 1360 may be used to perform the functions of the method 1100. Similarly, the functions of the method 1100 may be performed by one or more components of a QIP system such as the QIP system 1200 and its components (e.g., the optical controller 1220, the crosstalk controller 1240, and/or their subcomponents).

At block 1102, the method 1100 may include generating and applying a separate RF signal to each of multiple channels in the multi-channel AOM using a respective AWG (or direct digital synthesizer) to turn on the multiple channels, each of the multiple channels that is turned on interacting with at least one of the remaining channels in the multi-channel AOM that is not turned on causing a combined crosstalk effect on the at least one of the remaining channels, and each channel in the multi-channel AOM having a single respective AWG.

At block 1104, the method 1100 may include generating and applying a correcting RF signal to each of the at least one of the remaining channels using a respective AWG to produce an acoustic wave that at least partially corrects for the combined crosstalk effect caused by the multiple channels, the at least partial correction being such that turning on the multiple channels does not cause the at least one of the remaining channels to be unintentionally turned on.

In another aspect of the method 1100, the method 1100 further includes generating and applying an RF signal in addition to the correcting RF signal to one or more of the at least one of the remaining channels to turn on the one or more of the at least one of the remaining channels.

In another aspect of the method 1100, the multiple channels may be concurrently turned on.

In another aspect of the method 1100, the correcting RF signal generated and applied to each of the at least one of the remaining channels is an estimated signal based on the combined crosstalk effect from the interactions of the multiple channels with the at least one of the remaining channels, the estimated signal including a signal component for each of the interactions.

In another aspect of the method 1100, the combined crosstalk effect is a coherent crosstalk effect having a fixed phase relationship with respect to the separate RF signal applied to each of the multiple channels.

In another aspect of the method 1100, a frequency or frequencies of the correcting RF signal applied to each of the at least one of the remaining channels depend on a frequency or frequencies of the separate RF signal applied to each of the multiple channels.

In another aspect of the method 1100, generating and applying the correcting RF signal to each of the at least one of the remaining channels is delayed with respect to applying the separate RF signal to each of the multiple channels based on a time it takes for the combined crosstalk effect to manifest in the at least one of the remaining channels. The delay may be different for different ones of the remaining channels.

In another aspect of the method 1100, the at least partial correction for the combined crosstalk effect by the acoustic wave is time dependent.

In another aspect of the method 1100, the correcting RF signal generated and applied to the at least one of the remaining channels is based on an amplitude of one or more of the separate RF signal applied to each of the multiple channels.

In another aspect of the method 1100, the correcting RF signal generated and applied to the at least one of the remaining channels is based on an external factor including a temperature of the multi-channel AOM, and input optical beam applied to the multi-channel AOM, or both.

In another aspect of the method 1100, the method 1100 further includes measuring the combined crosstalk effect on the at least one of the remaining channels by observing one or more characteristics of an optical beam deflected from the at least one of the remaining channels. The measuring of the combined crosstalk effect may be performed multiple times and the correcting RF signal applied to the at least one of the remaining channels is an estimated signal based on the multiple measurements of the combined crosstalk effect. Measuring the combined crosstalk effect may further include measuring the combined crosstalk effect using a photodiode or a trapped ion aligned to detect the optical beam deflected from the at least one of the remaining channels. The method 1200 may further include adjusting, while measuring the combined crosstalk effect, the correcting RF signal applied to the at least one of the remaining channels to minimize the combined crosstalk effect.

In another aspect of the method 1100, the method 1100 may further include receiving, at the respective AWG, information of the correcting RF signal to be generated and applied to each of the at least one of the remaining channels, wherein the information is generated by an inferential model of the multi-channel AOM; and generating, by the respective AWG, the correcting RF signal for it to be applied to each of the at least one of the remaining channels based on the received information.

Figure 12:
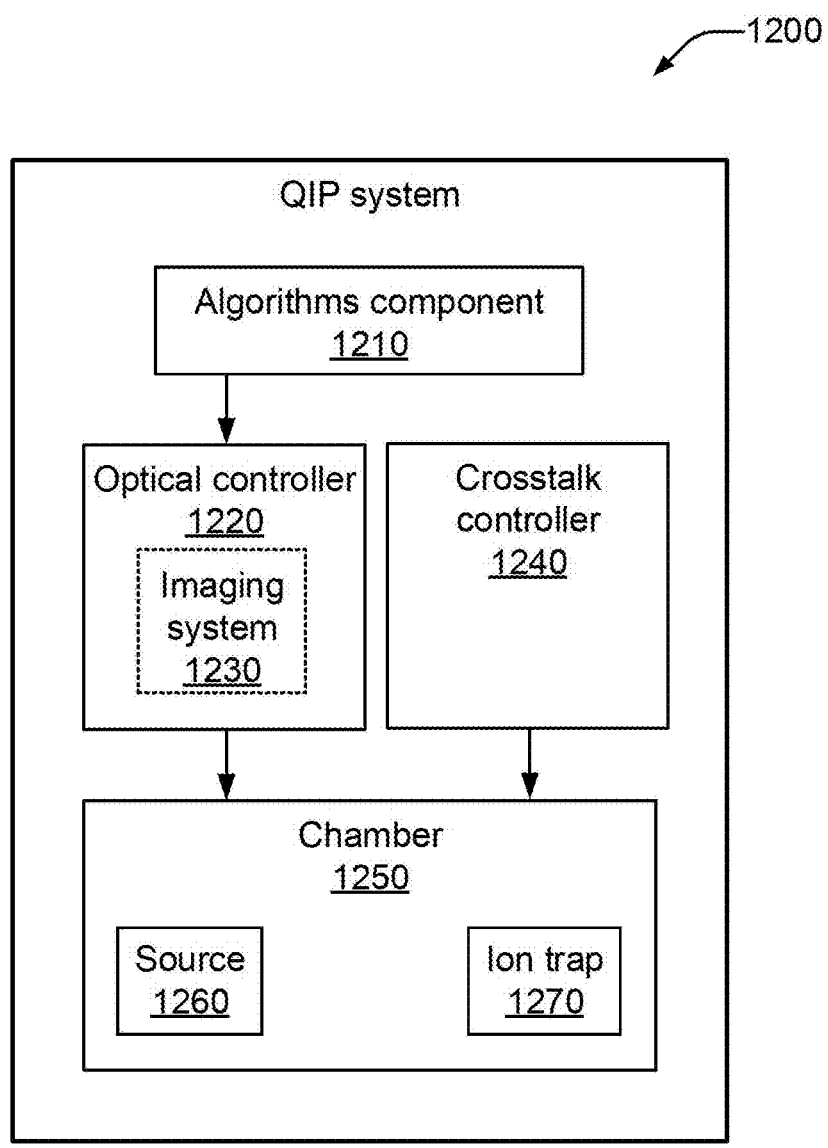
FIG. 12 is a block diagram that illustrates an example of a quantum information processing (QIP) system in accordance with aspects of this disclosure.

FIG. 12 is a block diagram that illustrates an example of a QIP system 1200 in accordance with aspects of this disclosure in which the techniques described above, as well as the methods described below, to control coherent crosstalk errors in multi-channel AOM using cancelation tones can be implemented. The QIP system 1200 may also be referred to as a quantum computing system, a computer device, a trapped ion system, or the like.

The QIP system 1200 can include a source 1260 that provides atomic species (e.g., a plume or flux of neutral atoms) to a chamber 1250 having an ion trap 1270 that traps the atomic species once ionized (e.g., photoionized) by the source 1260. The ion trap 1270 may be part of a processor or processing portion of the QIP system 1200.

The imaging system 1230 can include a high-resolution imager (e.g., CCD camera) for monitoring the atomic ions while they are being provided to the ion trap or after they have been provided to the ion trap 1270. In an aspect, the imaging system 930 can be implemented separate from the optical controller 1220, however, the use of fluorescence to detect, identify, and label atomic ions using image processing algorithms may need to be coordinated with the optical controller 1220. The AOMs described above, as well as the photodetectors and optical beam sources, may be part of the optical controller 1220.

The QIP system 1200 may also include an algorithms component 1210 that may operate with other parts of the QIP system 1200 (not shown) to perform quantum algorithms or quantum operations, including a stack or sequence of combinations of single qubit operations and/or multi-qubit operations (e.g., two-qubit operations) as well as extended quantum computations. As such, the algorithms component 1210 may provide instructions to various components of the QIP system 1200 (e.g., to the optical controller 1220) to enable the implementation of the quantum algorithms or quantum operations.

The QIP system 1200 may also include a crosstalk controller 1240 that is configured to perform the techniques described above to control coherent crosstalk errors in multi-channel AOM using cancelation tones. In one example, the crosstalk controller 1240 may apply the appropriate cancellation tones based on information collected by measurements performed by the crosstalk controller 1240 or by information collected separately and stored in the crosstalk controller 1240. The crosstalk controller 1240 is therefore configured to control the waveform generators to generate and apply appropriate compensation or correction signals to reduce or eliminate crosstalk effects. The crosstalk controller 1240 may provide information to the waveform generators to generate the appropriate signals. In some instances, the crosstalk controller may implement a model that is used to provide appropriate parameters from which to generate signals for crosstalk correction.

Aspects described above in connection with the system 300, the AOM 400, the system 500, and the AOM 700 may be implemented in whole or in part in the crosstalk controller 1240 and/or the optical controller 1220. Moreover, the QIP system 1200 may be used to implement or perform the methods 900, 1000, and 1100 described above in connection with FIGS. 9, 10, and 11.

Figure 13:
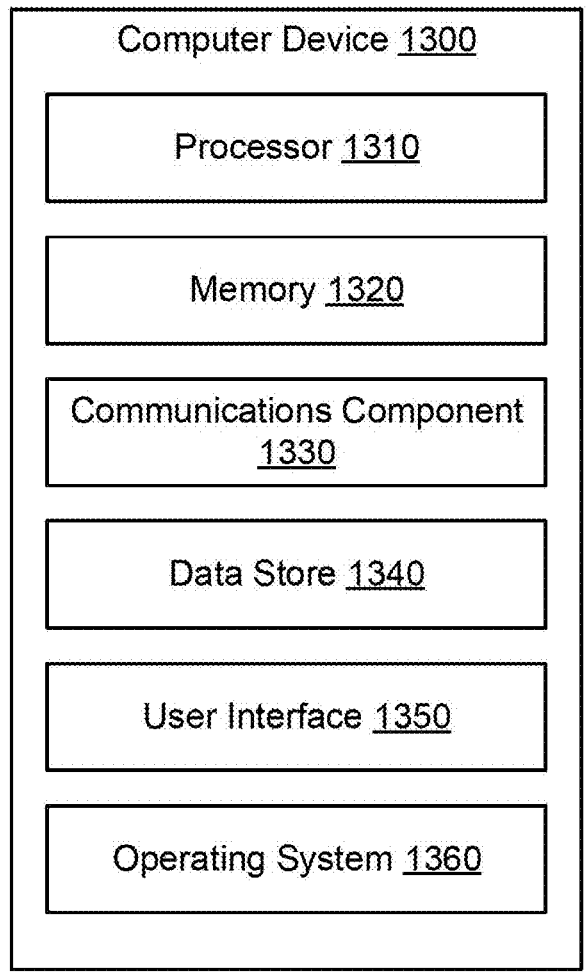
FIG. 13 is a diagram that illustrates an example of a computer device in accordance with aspects of this disclosure.

Referring now to FIG. 13, illustrated is an example computer system or device 1300 in accordance with aspects of the disclosure. The computer device 1300 can represent a single computing device, multiple computing devices, or a distributed computing system, for example. The computer device 1300 may be configured as a quantum computer (e.g., a QIP system), a classical computer, or a combination of quantum and classical computing functions. For example, the computer device 1300 may be used to process information using quantum algorithms based on trapped ion technology and may therefore implement methods to control coherent crosstalk errors in multi-channel AOM using cancelation tones A generic example of the computer device 1300 as a QIP system that can implement the various compensation schemes described herein is illustrated in the QIP system 1200 shown in FIG. 12.

In one example, the computer device 1300 may include a processor 1310 for carrying out processing functions associated with one or more of the features described herein. The processor 1310 may include a single or multiple set of processors or multi-core processors. Moreover, the processor 1310 may be implemented as an integrated processing system and/or a distributed processing system. The processor 1310 may include a central processing unit (CPU), a quantum processing unit (QPU), a graphics processing unit (GPU), or combination of those types of processors. In one aspect, the processor 1310 may refer to a general processor of the computer device 1300, which may also include additional processors 1310 to perform more specific functions such as functions for individual beam control.

In an example, the computer device 1300 may include a memory 1320 for storing instructions executable by the processor 1310 for carrying out the functions described herein. In an implementation, for example, the memory 1320 may correspond to a computer-readable storage medium that stores code or instructions to perform one or more of the functions or operations described herein. In one example, the memory 1320 may include instructions to perform aspects of the methods 900, 1000, and 1100 described above in connection with FIGS. 9, 10, and 11, respectively. Just like the processor 1310, the memory 1320 may refer to a general memory of the computer device 1300, which may also include additional memories 1320 to store instructions and/or data for more specific functions such as instructions and/or data for individual beam control.

Further, the computer device 1300 may include a communications component 1330 that provides for establishing and maintaining communications with one or more parties utilizing hardware, software, and services as described herein. The communications component 1330 may carry communications between components on the computer device 1300, as well as between the computer device 1300 and external devices, such as devices located across a communications network and/or devices serially or locally connected to computer device 1300. For example, the communications component 1030 may include one or more buses, and may further include transmit chain components and receive chain components associated with a transmitter and receiver, respectively, operable for interfacing with external devices.

Additionally, the computer device 1300 may include a data store 1340, which can be any suitable combination of hardware and/or software, that provides for mass storage of information, databases, and programs employed in connection with implementations described herein. For example, the data store 1340 may be a data repository for operating system 1360 (e.g., classical OS, or quantum OS). In one implementation, the data store 1340 may include the memory 1320.

The computer device 1300 may also include a user interface component 1350 operable to receive inputs from a user of the computer device 1300 and further operable to generate outputs for presentation to the user or to provide to a different system (directly or indirectly). The user interface component 1350 may include one or more input devices, including but not limited to a keyboard, a number pad, a mouse, a touch-sensitive display, a digitizer, a navigation key, a function key, a microphone, a voice recognition component, any other mechanism capable of receiving an input from a user, or any combination thereof. Further, the user interface component 1350 may include one or more output devices, including but not limited to a display, a speaker, a haptic feedback mechanism, a printer, any other mechanism capable of presenting an output to a user, or any combination thereof.

In an implementation, the user interface component 1350 may transmit and/or receive messages corresponding to the operation of the operating system 1360. In addition, the processor 1310 may execute the operating system 1360 and/or applications or programs, and the memory 1320 or the data store 1340 may store them.

When the computer device 1300 is implemented as part of a cloud-based infrastructure solution, the user interface component 1350 may be used to allow a user of the cloud-based infrastructure solution to remotely interact with the computer device 1300.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A method of operating a multi-channel acousto-optic modulator (AOM), comprising:

generating and applying a separate radio-frequency (RF) signal to each of multiple channels in the multi-channel AOM using a respective arbitrary waveform generator (AWG) to turn on the multiple channels, each of the multiple channels that is turned on interacting with at least one of the remaining channels in the multi-channel AOM that is not turned on causing a combined crosstalk effect on the at least one of the remaining channels, and each channel in the multi-channel AOM having a single respective AWG; and generating and applying a correcting RF signal to each of the at least one of the remaining channels using a respective AWG to produce an acoustic wave that at least partially corrects for the combined crosstalk effect caused by the multiple channels, the at least partial correction being such that turning on the multiple channels does not cause the at least one of the remaining channels to be unintentionally turned on.

2. The method of claim 1, further comprising generating and applying an RF signal in addition to the correcting RF signal to one or more of the at least one of the remaining channels to turn on the one or more of the at least one of the remaining channels.

3. The method of claim 1, wherein the multiple channels are concurrently turned on.

4. The method of claim 1, wherein the correcting RF signal generated and applied to each of the at least one of the remaining channels is an estimated signal based on the combined crosstalk effect from the interactions of the multiple channels with the at least one of the remaining channels, the estimated signal including a signal component for each of the interactions.

5. The method of claim 1, wherein the combined crosstalk effect is a coherent crosstalk effect having a fixed phase relationship with respect to the separate RF signal applied to each of the multiple channels.

6. The method of claim 1, wherein a frequency or frequencies of the correcting RF signal applied to each of the at least one of the remaining channels depend on a frequency or frequencies of the separate RF signal applied to each of the multiple channels.

7. The method of claim 1, wherein generating and applying the correcting RF signal to each of the at least one of the remaining channels is delayed with respect to applying the separate RF signal to each of the multiple channels based on a time it takes for the combined crosstalk effect to manifest in the at least one of the remaining channels.

8. The method of claim 7, wherein the delay is different for different ones of the remaining channels.

9. The method of claim 1, wherein the at least partial correction for the combined crosstalk effect by the acoustic wave is time dependent.

10. The method of claim 1, wherein the correcting RF signal generated and applied to the at least one of the remaining channels is based on an amplitude of one or more of the separate RF signal applied to each of the multiple channels.

11. The method of claim 1, wherein the correcting RF signal generated and applied to the at least one of the remaining channels is based on an external factor including a temperature of the multi-channel AOM, and input optical beam applied to the multi-channel AOM, or both.

12. The method of claim 1, further comprising measuring the combined crosstalk effect on the at least one of the remaining channels by observing one or more characteristics of an optical beam deflected from the at least one of the remaining channels.

13. The method of claim 12, wherein the measuring of the combined crosstalk effect is performed multiple times and the correcting RF signal applied to the at least one of the remaining channels is an estimated signal based on the multiple measurements of the combined crosstalk effect.

14. The method of claim 12, wherein measuring the combined crosstalk effect further comprises measuring the combined crosstalk effect using a photodiode, photodetection system, an atom, or a trapped ion aligned to detect the optical beam deflected from the at least one of the remaining channels.

15. The method of claim 12, further comprising adjusting, while measuring the combined crosstalk effect, the correcting RF signal applied to the at least one of the remaining channels to minimize the combined crosstalk effect.

16. The method of claim 1, further comprising:
receiving, at the respective AWG, information of the correcting RF signal to be generated and applied to each of the at least one of the remaining channels, wherein the information is generated by an inferential model of the multi-channel AOM; and
generating, by the respective AWG, the correcting RF signal for it to be applied to each of the at least one of the remaining channels based on the received information.

17. A multi-channel acousto-optic modulator (AOM) system, comprising:
a crystal with a plurality of radio-frequency (RF) antennas patterned on one side to form a plurality of channels of the multi-channel AOM system and an RF absorber on the other side, the crystal being configured to deflect one or more optical beams and shift a frequency of the one or more optical beams in a time-dependent manner; and
a plurality of arbitrary waveform generators (AWGs), each of which is associated with a respective channel of the plurality of channels,
wherein the plurality of AWGs are configured to:
generate and apply a separate RF signal to each of multiple channels in the multi-channel AOM to turn on the multiple channels, each of the multiple channels that is turned on interacting with at least one of the remaining channels in the multi-channel AOM that is not turned on causing a combined crosstalk effect on the at least one of the remaining channels, and each channel in the multi-channel AOM having a single respective AWG, and
generate and apply a correcting RF signal to each of the at least one of the remaining channels to produce an acoustic wave that at least partially corrects for the combined crosstalk effect caused by the multiple channels, the at least partial correction being such that turning on the multiple channels does not cause the at least one of the remaining channels to be unintentionally turned on.

18. The multi-channel AOM of claim 17, wherein the plurality of AWGs are further configured to generate and apply an RF signal in addition to the correcting RF signal to one or more of the at least one of the remaining channels to turn on the one or more of the at least one of the remaining channels.

19. The multi-channel AOM of claim 17, wherein the correcting RF signal generated and applied to each of the at least one of the remaining channels is an estimated signal based on the combined crosstalk effect from the interactions of the multiple channels with the at least one of the remaining channels.

20. A quantum information processing (QIP) system, comprising:
a multi-channel acousto-optic modulator (AOM);
a plurality of arbitrary waveform generators (AWGs), each of which is associated with a respective channel of the multi-channel AOM;
a trap having a plurality of trapped atomic-based elements; and
an optical source configured to emit one or more optical beams to respective channels on the multi-channel AOM to change a state of a respective one of the plurality of trapped atomic-based elements to implement a quantum operation, wherein the plurality of AWGs are configured to:
generate and apply a separate radio-frequency (RF) signal to each of multiple channels in the multi-channel AOM to turn on the multiple channels, each of the multiple channels that is turned on interacting with at least one of the remaining channels in the multi-channel AOM that is not turned on causing a combined crosstalk effect on the at least one of the remaining channels, and each channel in the multi-channel AOM having a single respective AWG, and
generate and apply a correcting RF signal to each of the at least one of the remaining channels to produce an acoustic wave that at least partially corrects for the combined crosstalk effect caused by the multiple channels, the at least partial correction being such that turning on the multiple channels does not cause the at least one of the remaining channels to be unintentionally turned on.

21. The QIP system of claim 20, wherein the plurality of AWGs are further configured to generate and apply an RF signal in addition to the correcting RF signal to one or more of the at least one of the remaining channels to turn on the one or more of the at least one of the remaining channels.

22. The QIP system of claim 20, wherein the correcting RF signal generated and applied to each of the at least one of the remaining channels is an estimated signal based on the combined crosstalk effect from the interactions of the multiple channels with the at least one of the remaining channels.

23. The QIP system of claim 20, wherein the atomic-based elements include charged ions, neutral atoms, and/or Rydberg atoms.

* * * * *